(12) United States Patent
Kauffeldt et al.

(10) Patent No.: US 8,989,591 B2
(45) Date of Patent: Mar. 24, 2015

(54) REMOTE OPTICAL DEMARCATION POINT

(75) Inventors: Hal V Kauffeldt, Plano, TX (US); Edward T Sullivan, Highland Village, TX (US)

(73) Assignee: Techsys Insights, Plano, TX (US)

( * ) Notice: Subject to any disclaimer, the term of this patent is extended or adjusted under 35 U.S.C. 154(b) by 461 days.

(21) Appl. No.: 13/490,314

(22) Filed: Jun. 6, 2012

(65) Prior Publication Data

US 2013/0330079 A1    Dec. 12, 2013

(51) Int. Cl.
*H04J 14/02* (2006.01)
*H04B 10/00* (2013.01)

(52) U.S. Cl.
CPC ......... *H04J 14/0275* (2013.01); *H04J 14/0254* (2013.01); *H04J 14/0221* (2013.01); *H04J 14/0273* (2013.01)
USPC ............. 398/140; 398/79; 398/135; 398/137; 398/162

(58) Field of Classification Search
CPC ..... H04J 14/02; H04J 14/0221; H04J 14/023; H04J 14/0239; H04J 14/0242; H04J 14/0254; H04J 14/0273; H04J 14/0275; H04J 14/278; H04B 10/25; H04B 10/272; H04B 10/40
See application file for complete search history.

(56) References Cited

U.S. PATENT DOCUMENTS

| | | |
|---|---|---|
| 6,577,414 B1 | 6/2003 | Feldman et al. |
| 6,594,047 B1 | 7/2003 | Ballintine et al. |
| 6,629,638 B1 | 10/2003 | Sanchez |
| 6,674,967 B2 | 1/2004 | Skrobko et al. |
| 6,882,765 B1 | 4/2005 | Erickson et al. |
| 7,190,896 B1 | 3/2007 | Wang et al. |
| 7,254,333 B2 | 8/2007 | Shimizu |
| 7,305,184 B2 | 12/2007 | Tian et al. |
| 7,317,874 B2 | 1/2008 | Li et al. |
| 7,394,981 B2 | 7/2008 | Manifold |
| 7,460,482 B2 | 12/2008 | Pike |
| 7,493,042 B2 | 2/2009 | Li et al. |
| 7,596,314 B2 | 9/2009 | Manifold |
| 7,761,010 B2 | 7/2010 | Crosby et al. |
| 7,773,539 B2 | 8/2010 | Gerstel |
| 7,778,544 B2 | 8/2010 | Hinderthur |
| 7,924,746 B2 | 4/2011 | Gerstel |
| 7,933,518 B2 | 4/2011 | Li et al. |
| 7,945,160 B2 | 5/2011 | Hinderthur |

(Continued)

FOREIGN PATENT DOCUMENTS

| | | |
|---|---|---|
| DE | 2004057891 A1 | 7/2004 |
| DE | EP 2071860 A1 | 12/2007 |

(Continued)

OTHER PUBLICATIONS

Roeland Nuijts, et al., "Design and OAM&P aspects of a DWDM system equipped with a 40Gb/s PM-QPSK alien wavelength and adjacent 10Gb/s channels", publication date unknown; publication source unknown, (3 pages).*

(Continued)

*Primary Examiner* — Darren E Wolf

(57) ABSTRACT

The invention is directed to apparatus, systems and methods enabling a service provider to establish an optical demarcation point located at or within equipment controlled at least in part by a customer's domain such that the service provider's domain is able to directly control access of an optical signal to their domain.

33 Claims, 10 Drawing Sheets

(56) References Cited

U.S. PATENT DOCUMENTS

| | | | |
|---|---|---|---|
| 7,957,650 | B2 | 6/2011 | Pan et al. |
| 7,983,560 | B2 | 7/2011 | Maki et al. |
| 8,055,129 | B2 | 11/2011 | Butler et al. |
| 8,155,526 | B2 | 4/2012 | Gray |
| 8,280,249 | B2 | 10/2012 | Friedrich et al. |
| 8,300,659 | B2 | 10/2012 | Hinderthuer |
| 8,358,934 | B2 | 1/2013 | Hinderthuer et al. |
| 8,406,630 | B2 | 3/2013 | Hinderthiir et al. |
| 8,452,173 | B2 | 5/2013 | Hehmann et al. |
| 8,467,679 | B2 | 6/2013 | Hinderthiir |
| 8,483,565 | B2 | 7/2013 | Elbers et al. |
| 8,494,362 | B2 | 7/2013 | Hinderthiir |
| 2002/0149821 | A1 | 10/2002 | Aronson et al. |
| 2003/0020979 | A1 | 1/2003 | Bell |
| 2005/0249468 | A1 | 11/2005 | Aronson et al. |
| 2007/0280265 | A1 | 12/2007 | Gerstel |
| 2008/0069564 | A1 | 3/2008 | Bernard |
| 2009/0279888 | A1 | 11/2009 | Butler et al. |
| 2009/0317073 | A1 | 12/2009 | Hotchkiss et al. |
| 2010/0104285 | A1 | 4/2010 | Shaffer et al. |
| 2010/0202777 | A1 | 8/2010 | Liu et al. |
| 2011/0158642 | A1 | 6/2011 | Barnard et al. |
| 2012/0219143 | A1 | 8/2012 | Hehmann et al. |
| 2012/0328293 | A1 | 12/2012 | Grobe et al. |
| 2013/0045013 | A1 | 2/2013 | Schmuck et al. |

FOREIGN PATENT DOCUMENTS

| | | |
|---|---|---|
| DE | EP 2124474 B1 | 5/2008 |
| DE | EP 2071862 A1 | 12/2008 |
| DE | EP 2071863 A1 | 12/2008 |
| DE | EP 2071864 A1 | 12/2008 |
| DE | EP 2071865 B1 | 12/2008 |
| DE | EP 2290860 A1 | 8/2009 |
| DE | EP 2 299 610 A1 | 3/2011 |
| DE | EP 2642676 A1 | 9/2013 |
| EP | 1 152 631 A3 | 7/2001 |
| EP | 1 152 631 B1 | 7/2001 |
| FR | WO 2011104070 A1 | 9/2011 |
| SE | 2003079702 A1 | 9/2003 |
| WO | 9313484 A1 | 8/1993 |
| WO | 9531057 A1 | 11/1995 |
| WO | 2009008874 A1 | 1/2009 |
| WO | 2010048883 A1 | 5/2010 |

OTHER PUBLICATIONS

Dickinson, et al., Cable Data Services, DOCSIS Provisioning of EPON Specifications, DPoE Demarcation Device Specification, DPoE-SP-DEMARCv1.0-I01-120410, published Apr. 10, 2012 (47 pages).*

Serge Melle, et al., "Alien Wavelength Transport: An Operational and Economic Analysis", Conference Proceedings of OSA/OFC/NFOEC 2009, paper (3 pages).

Serge Melle, et al. "Network Cost Savings from Router Bypass in IP over WDM Core Networks," OFC-NFOEC 2008. (10 pages).

Ori Gerstel, "IP over DWDM: An Industry Attempt to Clean the Slate for the Core", 2007, (25 slides).

Ori Gerstel, et al., "Operational Solutions for an Open DWDM layer", OSA/OFC/NFOEC 2009, (3 pages).

Peter Magill, "Dynamic Multi-Layer Mesh Networks: A Provider's Perspective", ECOC 2009—Symposium 6.7 (40 slides).

Barbara E Smith, "AT&T Optical Transport Services", Conference Proceedings of OSA/OFC/NFOEC 2009, paper (3 pages).

Danilto Ventorini, et al. "Demonstration and Evaluation of IP over DWDM Networking as 'Alien Wavelength' over existing carrier DWDM infrastructure", OFC-NFOEC 2008, (6 pages).

Dirk Schroetter, "IP and Ethernet over DWDM", Cisco Networkers 2009 conference, Jan. 26-29, Barcelona, Spain, (137 Slides).

Paul R. Morkel, et al., "Integrated IP-Optical Networks. Demonstration of DWDM Router-to-Router IP Transport Over 574km SMF Fiber Link Using 11.1Gbit/s OTN Pluggable Interface with Integrated G.709 and FEC", OFC/NFOEC 2008, (6 pages).

David Z. Chen, Michael F. Lane, "Emerging Network Need for Alien Wavelength Management", Optical Society of America 1-55752-830-6, 2007, (10 pages).

T. Zami, et al. "Driving Technologies Addressing the Future Dynamic Transparent Core Networks", International Conference on Transparent Optical Networks, 2008, p. 194-197.

Kazam Sohraby, et al., "Resource Management in an Integrated Optical Network", IEEE Journal on Selected Areas in Communications, vol. 20, No. 7, Sep. 2003, (11 pages).

Oezcan Ekice, "Extended Distance Solutions: IP/SAN-over-WDM Solution for Next Generation Networks", IT-Symposium 2006 Conference, Cisco 2005, (30 slides).

Jaromir Pilar, "DWDM technology for SP NGN infrastructure", T-COM Slovakia, Mar. 2009, Cisco 2007, (55 pages).

"IP-Optical Integration for Managing Wavelengths in Routers", Juniper Networks white paper, 2010, (10 pages).

Alexandr Bakharevsky, "Optical Packet Transport solution", Cisco presentation, Apr. 2001. (Slides 1-128).

Mark Nowell, "Interworking of IP and OTN networks—making IP over OTN a reality", 2009 OSA/OFC/NFOEC 2009, (3 pages).

R. Kunze, "A framework for Management and Control of optical interfaces supporting G.698.2", IETF Internet Draft, Jul. 2011, (20 pages).

* cited by examiner

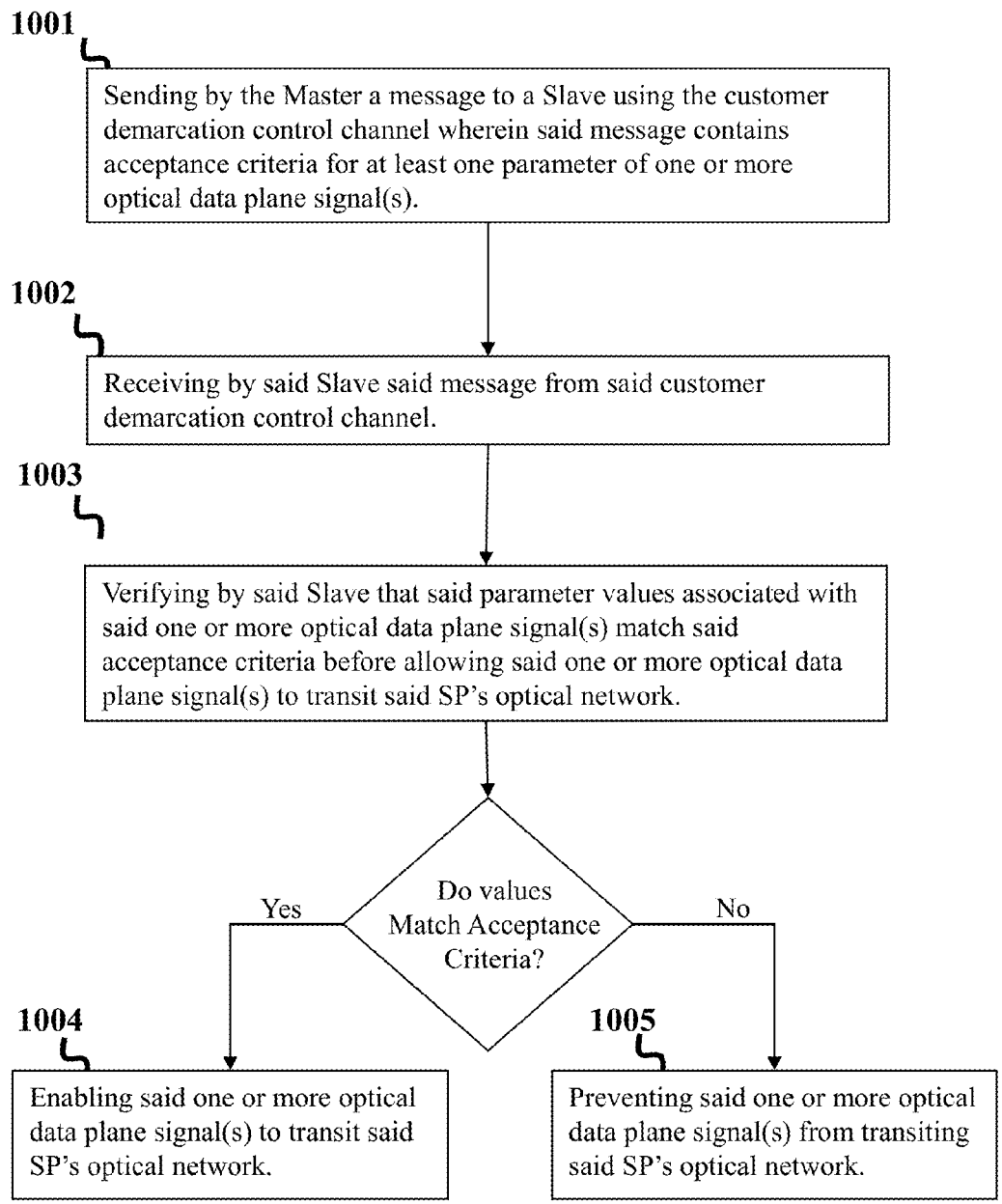

REMOTE OPTICAL DEMARCATION POINT

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

It is common in modern optical networks for the ingress of the transport network to use an optical transponder as a termination point for converting a 'gray' low cost optical signal from a customer's optical interface to a 'colored' optical signal on a service provider's network element. The 'colored' optical signal, or Wavelength Division Multiplex (WDM) signal, is typically enhanced, or 'digitally wrapped' with Optical Transport Network (OTN) overhead to provide service transparency, performance management capabilities and Forward Error Correction (FEC) coding for increased optical reach across the transport network. The WDM signal may then be transmitted across one or more optical links and through numerous intermediate devices before reaching the egress point of the transport network. At the egress point the WDM signal is terminated optically, the OTN overhead is removed and processed, and the remaining signal is converted back to a 'gray' low cost optical signal for transmission to the customer.

The transponder serves as the demarcation point between the operation, control and ownership of facilities of the service provider's network, hereafter referred to as SP, and the customer premise equipment. Examples of customer premise equipment may include a server, router or switch located at the campus of a business or it could be a WDM Terminal or Reconfiguration Optical Add Drop Multiplexer (ROADM) edge node from an SP in a different administrative domain.

FIG. 1 shows an example network wherein the operation, control and ownership domain of the SP is depicted in the shaded portion of the figure while the operation, control and ownership domain of the customer is depicted in the unshaded portion of the figure. Since the network element of the SP performs optical-to-electrical-to-optical (OEO) conversion on each incoming and outgoing signal to and from its network, it is able to isolate and verify the quality of the received customer optical signal as it enters the SP's network and it is able to isolate and verify the quality of the WDM optical signal within its network. If there is a problem, the SP is able to identify the source of the problem as either within or outside of its own network.

Routing high speed optical signals across the transport network is very complicated. The signals may traverse long distances over multiple spans and through numerous nodes each of which may contain various components that impact the end to end quality of the optical signal. Example intermediate devices may include amplifiers (Erbium Doped Fiber Amplifier (EDFA) and Raman) and ROADMs of different types; all of which have the potential to impair the optical signal.

The SP's network management and control system uses its knowledge of the transport optical path to determine the availability and feasibility of any given channel taking into account factors such as dispersion and non-linear effects that may be a function of channel wavelength, modulation format, bit rate/line coding and/or minimum and maximum launch and receive channel powers, among others.

A transponder at each edge of the SP's network provides the necessary control logic for ensuring that the launch and receive powers and the signal quality are within acceptable tolerances given any impairment effects within the transport network. Although transponders can be expensive, take up a significant amount of space, consume a lot of power and require extensive cooling to function properly, they enable the SP to offer and verify service level guarantees to their customers.

For years the industry has explored the option of developing an all optical transport network that is protocol independent and bit-rate agnostic without the use of OEO conversions at the edge of the SP's network. To this end, customers have requested support for 'alien' wavelengths by the SP's and equipment suppliers. An alien wavelength is a WDM compliant wavelength that is originated by an optical interface that is not part of the SP's equipment. Support for alien wavelengths has the potential to reduce total equipment costs by moving the WDM optical interface to the customer node thus eliminating the 'gray' optics between the SP and the customer. It also has the potential to reduce capital and operational costs of the SP by reducing equipment, space, power and cooling requirements through the elimination of transponders. Further, it has the potential to simplify the structure of the network through the removal of the separate customer to SP spans and the corresponding separate fault and performance management segments at each end of the network. Finally, by enabling true end-to-end control and monitoring of a connection, both the SP and the customer may have a consistent view of the fault and performance management properties of the facility.

Given the complexity of ensuring end to end quality of the optical signal across the transport network, providing support for alien wavelengths has numerous control and management challenges that must first be resolved to ensure proper end to end operation. Considerations include operational procedures for channel setup, teardown, maintenance and management of channel optical parameters as well as fault sectionalization of the customer/service provider interface.

Current proposals for the support of alien wavelengths include the ITU-T Recommendation G.698.2 (November/2009) "Amplified multichannel dense wavelength division multiplexing applications with single channel interfaces" and the IETF draft draft-kunze-698-mgmt-ctrl-framework-00 (Jul. 1, 2011) "A framework for Management and Control of optical interfaces supporting G.698.2", both included herein by reference. Both describe a 'black link' approach where the WDM transceiver is located at the customer node, or site, without the need for 'gray' optics. The ITU recommendation defines the channel optical parameters for a single optical interface as defined at the S interface (ingress to optical network) and R interface (egress from optical network). The IETF draft defines a high level framework for a necessary connection between the CPE's domain and that of the SP.

An example of a black link approach is depicted in FIG. 2. The tasks associated with configuration, provisioning and operation can be segmented and distributed across the domains of the customer and SP using a direct connection between the management systems of each. However, this approach adds a lot of complexity to operational procedures as well as to the design of the management and control systems. For instance, determination of center frequency and the channel setup procedure is controlled by the domain of the customer while other procedures are under the control of the SP. For an SP that typically performs interoperability testing of new equipment before actual deployment on its network, verifying the interoperability with a large number of customer domain management systems can require a significant effort.

A further method, such as those of U.S. Pat. No. 7,773,539 or its continuation-in-part U.S. Pat. No. 7,924,746, both disclosed herein by reference, defines a Virtual Transponder (VTXP) wherein a WDM interface in a router in one domain is modeled as a logical optical interface in the SP optical network element in a different domain and a control channel is established between the network management systems of each domain. The control channel exchanges information that can be used to negotiate, configure and/or manage the WDM interface on the router. The virtual transponder protocol converts messages between the domains in each management system. For example, a Link Management Protocol process runs between the NE controllers of each corresponding network element.

Although both approaches above enable the SP to get access to information related to the optical parameter settings of WDM optics, they still fall short of the traditional model where the SP has independent control over all WDM optical signals entering their network. To more accurately model the traditional approach used by the Service Provider, requires co-ordination and communication between the SP and customer domains. In particular, none of these approaches provide the SP with the ability to control access of an optical signal into their domain independent of control actions requested or required of the other domain.

FIG. 3 depicts an approach for a remote demarcation device that utilizes native WDM interfaces on the customer equipment at each end of the optical link such that these interfaces can share operational information with each other using unused overhead bytes of an OTN framing structure, such as that disclosed in US patent application US20090317073, included herein by reference. Unfortunately, this type of demarcation point also does not meet the objectives of the traditional demarcation point where the WDM interfaces are directly under the control of the SP. This approach allows information to flow between two WDM interfaces, each at a different location, but does not provide a mechanism that allows the SP to control access to the transport network before the connection is even established. This approach may augment support for alien wavelengths, but it has some of the same problems as the 'black link' approach in terms of control over access of the optical signals into the SP's network.

An apparatus, method and system for supporting alien wavelengths or which allows placing the WDM transceivers at the customer site without breaking the traditional model of independent control currently employed by the SP is preferred. At the very least, access to the transport network that is based upon direct knowledge of one or more of the optical properties of the WDM optical signal must be directly under the control of the SP's management system. Preferably, direct control of the channel optical parameters of the WDM optical signal and control over key operational procedures of the WDM optical channel should be handled by the SP. It is also desirable that such apparatus and method not preclude the option of using a segmented or integrated management solution as discussed above. Finally, it is desirable that the service provider has the option of sharing, in a read-only manner, information that it directly controls with the customer.

BRIEF SUMMARY OF THE INVENTION

We define the following five terms:

"Domain" (from FS-1037C, variant 2) is, in distributed networks, all the hardware and software under the control of a specified set of one or more host processors.

"CPE" refers to equipment at least partially managed by a customer's domain (i.e. a domain other than that of the service provider).

"Customer demarcation control channel" (CCC) refers to a communication channel between two ports within a service provider's domain, where one of the ports is located at or within a CPE, and which is transported in a form and/or manner which does not alter the format or content of any optical data plane signal, with the exception of the amplitude thereof when said customer demarcation control channel is superimposed thereupon.

"Data plane signal" is an electrical or optical signal conveyed between equipment of a customer's domain and equipment of a service provider's domain.

When a data plane signal passes between equipment of different domains, the signal characteristics may or may not be altered. For example, and without limitation, the signal may be changed between electrical and optical forms, optical signal characteristics may be altered by adjusting the optical signal power level, or by altering the optical signal spectrum, or the format may be altered by adding OTN and FEC overhead, or by multiplexing or de-multiplexing, or by superimposing a CCC upon the data plane signal. A data plane signal will be conveyed as an optical data plane signal within a service provider's network, regardless of its form within the customer's domain.

"Alien wavelength" is an optical data plane signal, wherein the optical origin of the signal lies outside the domain of the service provider.

An objective of the present invention is to provide an apparatus, system and method enabling a service provider to establish an optical demarcation point such that the service provider is able to exercise direct control over access of an optical data plane signal into their domain.

A further objective of the present invention is to provide an apparatus, system and method for moving the origination of optical data plane signal(s) to a customer node or site while providing a clear optical, and optionally electrical, demarcation point between the customer and the SP.

A further objective of the present invention is to provide an apparatus, system and method enabling origination of optical data plane signal(s) at a customer node or site while providing a clear optical and electrical demarcation point between the customer and the SP wherein the electrical demarcation point involves OTN overhead processing.

A further objective of the present invention is to provide one or more of said apparatuses in a form consistent with one or more Multi-Source Agreements (MSAs), examples of which include without limitation, SFP, SFP+, XFP, CFP, X2, or XENPAK.

A further objective of the present invention is to enable the service provider direct control of channel activation and deactivation through knowledge of and/or the provisioning of, for one or more optical data plane signals comprising said channel, one or more of the following attributes herein referred to as "optical signal parameters"; the center wavelength(s), optical signal width(s), optical signal state(s) of polarization, transmitted and/or received optical signal power level(s), the modulation format(s), the modulation symbol rate(s), the operational on/off status(es), optical signal-to-noise ratio(s) (OSNR) of said signal(s), parallel lane count, or, if packaged as a module compliant with a Multi-Source Agreement (MSA), the type and/or manufacturer of the module employed at the CPE.

A further objective of the present invention is to enable a service provider to perform one or more functions at such an optical demarcation point such as retrieve inventory information or monitor performance of the apparatus and/or signals at said point.

A further objective of the invention is to enable a service provider to track and respond to events such as power cycles and other failure conditions which occur or are detected at such an optical demarcation point.

A further objective of the invention is to provide a single solution that may be used in both intra-domain and inter-domain applications within and/or among metro, regional, long haul and hybrid optical networks for control of an optical demarcation point with support for single and/or multi-channel optical links while being protocol, modulation rate, modulation format, and bit-rate independent.

A further objective of the invention is to provide said solutions in a manner which does not preclude the additional use of the aforementioned black link and/or VTXP approaches.

As may be apparent from the embodiments disclosed herein, the invention offers several advantages over the prior art. Further, the inventive apparatus, systems and methods are not limited to the specific embodiments described herein. Other advantages may also be apparent, especially in certain specific cases where the invention may offer further advantages over the prior art.

BRIEF DESCRIPTION OF THE SEVERAL VIEWS OF THE DRAWING

FIGS. 6a and 6c show high level block diagrams of variants of an MSA compatible Slave module while

FIG. 10 shows a further example method for verifying the optical parameters associated with at least one optical data plane signal originating at the CPE equipment location, wherein the inventive method determines at the Slave location whether or not the optical data plane signal(s) meets the criteria of acceptance as defined by the service provider's network management system.

DETAILED DESCRIPTION OF THE INVENTION

The present invention will now be described more fully, using a subset of its embodiments. Additional embodiments will be apparent to those skilled in the art and are covered by the claims of the invention.

Figure 1:
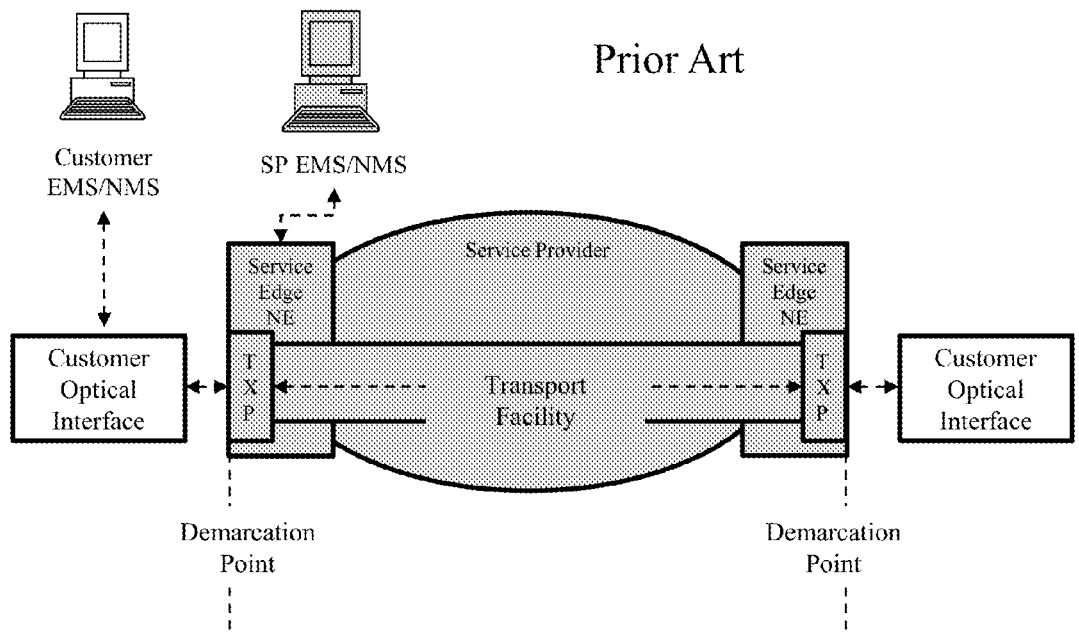
FIGS. 1-3 depict prior art examples of WDM demarcation points and/or arrangements between network equipment within the service provider domain and the corresponding customer equipment within the customer domain.
Figure 2:
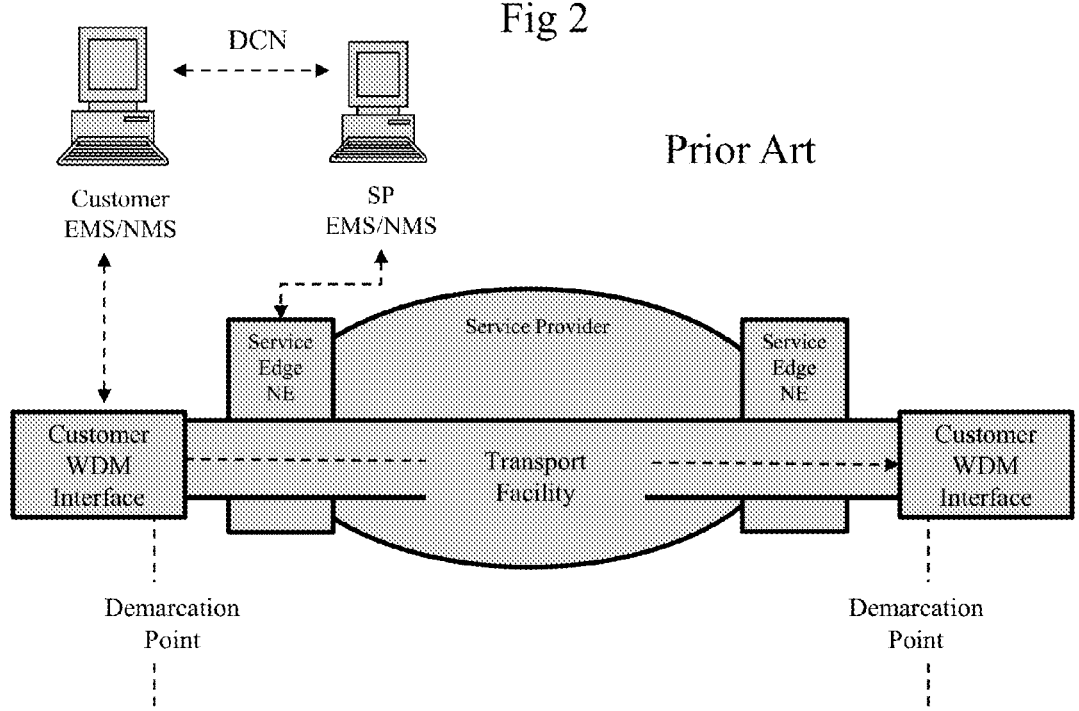
Figure 3:
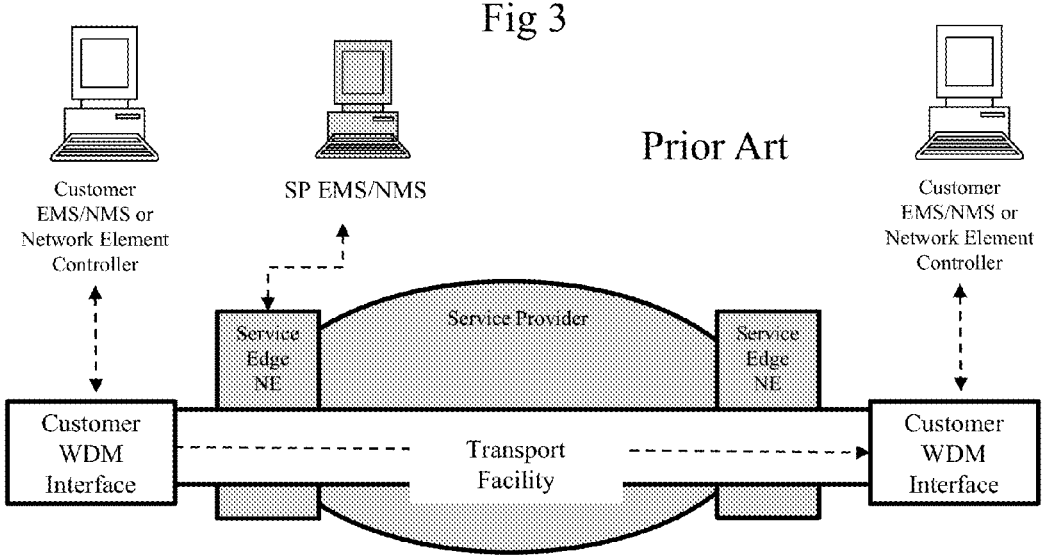
Figure 4:
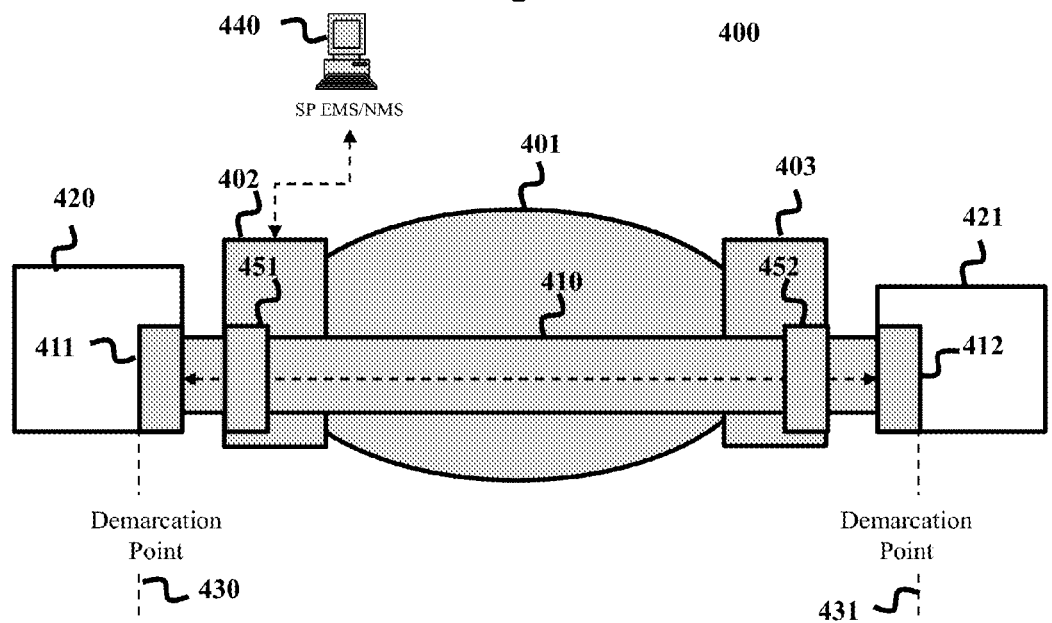
FIG. 4 depicts the domain boundaries and some element relationships consistent with the inventive proposal.

The inventive system is similar to that of an Optical Network Terminal (ONT) found at remote customer sites in Fiber To The Home (FTTH) networks, or to the use of Ethernet™ demarcation points at various CPE sites. The inventive system, as depicted in FIG. 4, extends the demarcation points 430 and 431 to the CPE locations. Ideally this includes placing WDM transceivers or all-optical signal converters at remote nodes 420 and 421 wherein the SP's control and management system has independent and direct control over these devices such that the SP has complete control over the optical data plane signals from these points entering their transport network.

The inventive system defines three elements for meeting this objective: a Master port (hereafter referred to as Master), two instances of which are 451 and 452, preferably located at an SP edge node, here 402 and 403, respectively, a Slave port, (hereafter referred to as Slave), two instances of which are 411 and 412, preferably located at a CPE node, here 420 and 421, and a customer demarcation control channel facilitating communication between each corresponding paired Master and Slave (not shown explicitly in FIG. 4). It is preferable, but not required, that a Slave resides within an MSA approved module (hereafter referred to as a Slave module), such as an XFP pluggable device, located at a CPE node. Any number of Slaves may be associated with any number of Masters, although for simplicity we will describe embodiments using a single Slave paired with a single Master. By way of non-limiting examples, more than one Master may be associated with a Slave, for instance as a way of achieving redundancy of the Master functions, while more than one Slave may be controlled by a single Master, for instance as a way of minimizing overall system costs.

A Master includes control logic used to verify that the optical signal parameters of one or more optical data plane signal(s) conform to the acceptance criteria defined by the SP. A Master may control access to the ingress of the transport network directly using control logic, preferably located at the SP edge node closest to the Slave. Alternatively, a Master may control access to the transport network indirectly by issuing command messages to an associated Slave at a remote node to block optical data plane signal(s) from being transmitted from a remote node. A Master is owned by the SP, and managed and controlled by the SP's management system. Note that even though the Master may control access indirectly, for example, via communications with the Slave, the SP still has direct control over the access, since all control elements are within the SP's domain. Furthermore, a Master may allow access by some optical data plane signals while denying access to others, regardless of whether or not those signals pass through the same Slave, assuming that the embodiments of the Master and Slave provide adequate granularity of control.

A Slave includes control logic to manage and store optical signal parameter values concerning the status, operation and configuration of the associated optical data plane signal(s). An SP may choose to use such properties as part of its acceptance criteria relative to allowing ingress of said optical data plane signal(s) from the CPE into at least some portion of the SP's transport network.

A Slave is operable to process and respond to requests by a Master to retrieve optical signal parameters and, if necessary, perform control functions at the request of a Master. For instance, a Slave may contain control logic to block an outgoing modulated or un-modulated optical data plane signal as requested by a Master. Although a Slave is under the direct control of the SP's management system via a Master, it is not necessarily owned by the SP.

A CPE control channel, CCC, running between a Master and at least one Slave may use a packet based messaging protocol, a bit oriented protocol, a low level command line messaging format, or indeed any protocol which allows exchange of the desired information without departing from the spirit of the invention. Advantageously, a CCC may employ a framed structure with various overhead elements and associated functions, such as a SONET, SDH or OTN compliant frame format signal structure, which allows services such as performance monitoring, error correction, and fault detection to be performed relative to the CCC signal itself. Further, a CCC may employ different rates, techniques and/or formats in the opposing directions.

Additionally, a CCC could be assigned a wavelength independent of the wavelength used for one or more optical data plane signal(s), be transported via one or more orthogonally polarized signal(s) relative to those of said optical data plane signal(s), or a CCC could be transported via a pilot tone modulated onto one or more optical data plane signal(s). Indeed, a CCC may be transported between Master and Slave in any manner, as long as it remains within the boundary of the domain of said Master and Slave, although it is preferable that a CCC be transported via the same optical medium as that of the corresponding one or more optical data plane signal(s) for which access to the SP's network is controlled by said Master and Slave.

One skilled in the art will recognize that many methods of providing a control channel between a Slave and a Master are within the scope of the invention. Additionally, a CCC may employ different formats or techniques in the opposing directions without departing from the scope of the invention. Further, different CCCs may employ different formats or techniques over a given optical transmission link, such as through a free space optical link, a waveguide, or an optical fiber, or they may even employ different formats or techniques simultaneously.

Further, the use of an optical channel for a CCC, which is distinct relative to an optical data plane signal, enables a flexible design such that a Master can access a Slave independent of whether an optical data plane signal is present. For example, a Slave may incorporate an optical source operating at a wavelength different than that of any optical data plane signal over which access control is to be exercised, and a Master may optically loop a CCC signal received from said Slave back and employ said optical signal as a carrier for CCC communication messages from said Master to said Slave. A further example is that of a Slave employing an orthogonal state of polarization for a CCC signal sent to a Master, with respect to the state of polarization used by an optical data plane signal, wherein said CCC may be transported to said Master even if said optical data plane signal path is blocked by said Slave through appropriate control over the elements along the optical paths of the signals possessing the orthogonal states of polarization.

A pilot tone that uses an optical data plane signal as a carrier for a CCC requires an optical data plane signal source to be functioning and a path between the Slave and Master. However, such pilot tone does not require such an optical data plane signal to be modulated with customer data. For instance, the continuous wave of a carrier from a WDM transmitter can be modulated by a CCC modulator on a Slave module without said carrier carrying customer data. In this type of embodiment for a CCC, controlled access to the ingress of the SP's network would ideally be located and controlled at a Master. Further, a CCC may be simultaneously modulated on more than one optical data plane signal, or portions of a CCC may be separately modulated onto each one of multiple optical data plane signals without departing from the scope of the invention. For example, if a WDM optical channel employs multiple parallel signal lanes, a CCC may be transported using pilot tones on one or more of said lanes.

Both a Slave and a Master may initiate message transfers to/from each other. For instance, a Slave may send notification of a status change of one or more optical signal parameter(s) without requiring a request message from a Master.

Figure 5A:
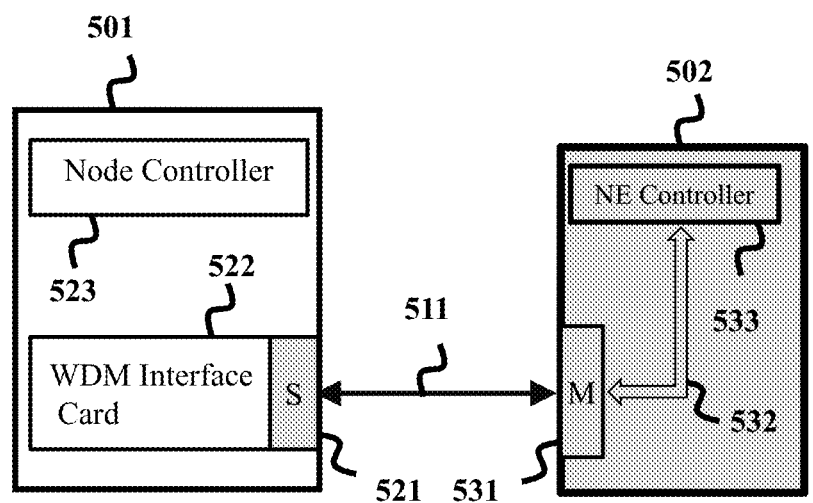
FIGS. 5a and 5b show two different network embodiments consistent with the invention.
Figure 5B:
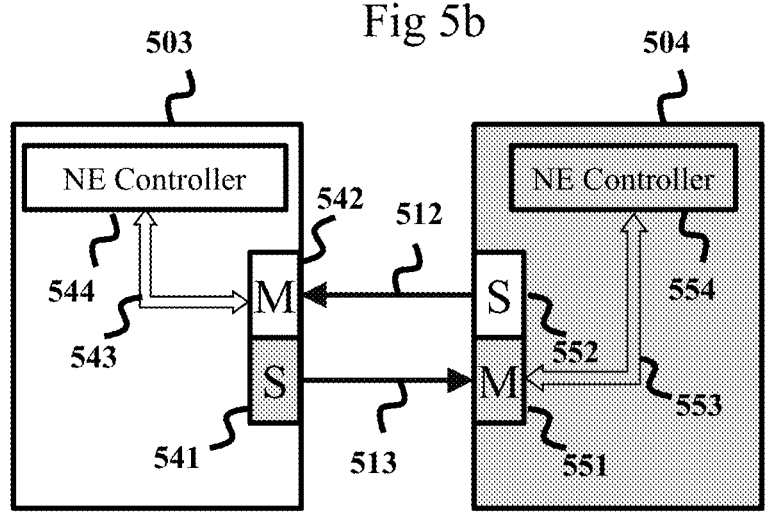

FIGS. 5a and 5b show two preferred system embodiments of network level configurations between a Slave module and a Master. Shading is used to indicate elements which are members of a given domain.

FIG. 5a shows a customer node 501 connected by fiber to service provider edge node 502. Node 501 contains a node controller 523 and a WDM interface card 522. Plugged into the WDM interface card 522 is Slave module 521. The SP's edge node 502 contains Network Element (NE) Controller 533, and Master 531 connected via path 532. The Master 531 works under the control of, or with coordination from network element controller 533.

A Master controller is not necessarily an independent controller. A Master controller function could be incorporated into an NE controller. Further, a Master controller may be connected to other elements within the same domain, including, without limitation, other NE controllers, Element Management Systems, Network Management Systems or other control and management functions within said domain.

The optical path 511 between nodes 501 and 502 is, in this embodiment, composed of a fiber pair wherein each fiber carries one or more optical data plane signals and a CCC optical signal and wherein the direction of signals flowing along a first fiber is counter-propagating relative to that of the signals on the second fiber.

An alternative method is to use a single fiber carrying bi-directional optical data plane signals and CCC optical signals. The single fiber case requires that the wavelengths assigned to the optical data plane signal(s) and CCC optical signal in a first direction differ from those in a second direction such that there is no interference between the co-propagating and the counter-propagating signals on the single fiber. Further alternatives include, without being exhaustive, the use of free space optical pathways between Master and Slave.

FIG. 5b depicts a connection between two SP edge nodes 503 and 504 that are located in different domains and wherein each is a customer of the other and each includes both a Master and a Slave, as shown by 551 and 541 within the domain of 504, and 542 and 552 within the domain of 503. Fiber 512 carries communication from Master 551 to Slave 541 as well as communication from Slave 552 to Master 542, while fiber 513 carries communication from Master 542 to Slave 552 as well as communication from Slave 541 to Master 551. Master 542 is connected to NE controller 544 via communication path 543 at node 503. Master 551 is connected to NE Controller 554 via communication path 553 at node 504.

In this embodiment a Slave contains the same functionality as the Slave module shown in FIG. 5a without necessarily being packaged as a module. Master/Slave peering between the nodes enables each node to include a Master controlling ingress to its transport network and enables each node to include a Slave in support of its peer.

Variations are possible which remain consistent with the scope of the invention. One example is that Master to Slave communications may be carried using one wavelength, while Slave to Master communications may be carried using a different wavelength, wherein both of these wavelengths differ from those of the optical data plane signals which are also transiting these fibers. Another example is that the Master and Slave pair associated with one domain, such as Master 542 and Slave 552, may utilize bi-directional communication over one of the two fibers, such as fiber 512, while Master 541 and Slave 551 may employ bi-directional communication over the other fiber, here fiber 513. Bi-directional CCC optical communication over a single fiber is permissible even if the optical data plane signals may traverse the fibers in a unidirectional manner per fiber.

Still further variations are possible if the CCC signals are transported using pilot tone techniques. For example, a Master to Slave direction signal may be superimposed upon one or more optical data plane signals used as carriers to transport the CCC using pilot tone techniques wherein said CCC pilot tone signal is modulated at one frequency, while a different frequency may be used for a Slave to Master direction signal also carried using pilot tone techniques, wherein said Slave to Master direction signal is superimposed upon the one or more optical data plane signals, possibly including the same optical data plane signal(s) used for the Master to Slave direction CCC signal. In all cases, the CCC signals corresponding to a given Master/Slave pair are separate from those of any other Master/Slave pair.

Figure 6A:
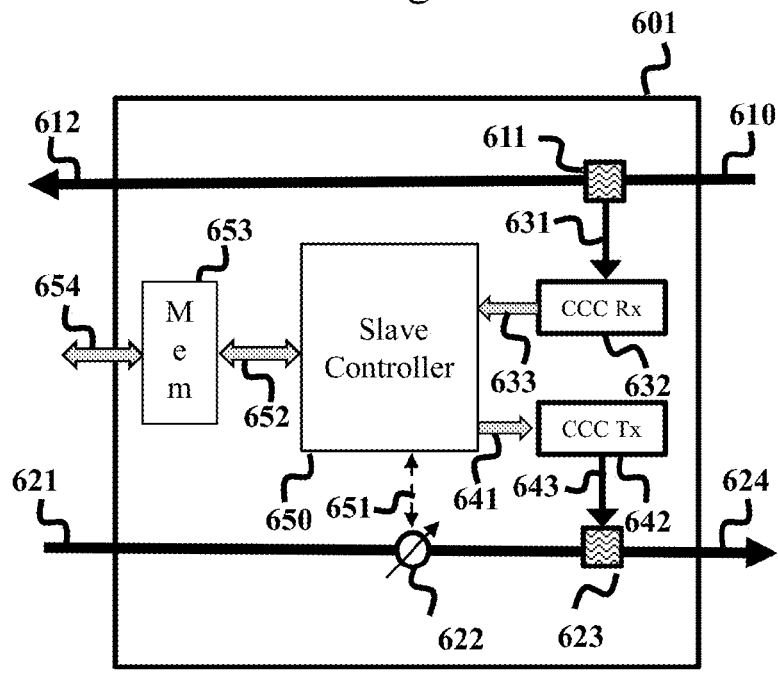

FIG. 6a depicts a block diagram of a Slave module apparatus. This module is preferably suited for being mounted on a WDM interface, such as, by way of example, the WDM interface card of FIG. 5a, which is in turn a part of some customer premise equipment.

Figure 6B:
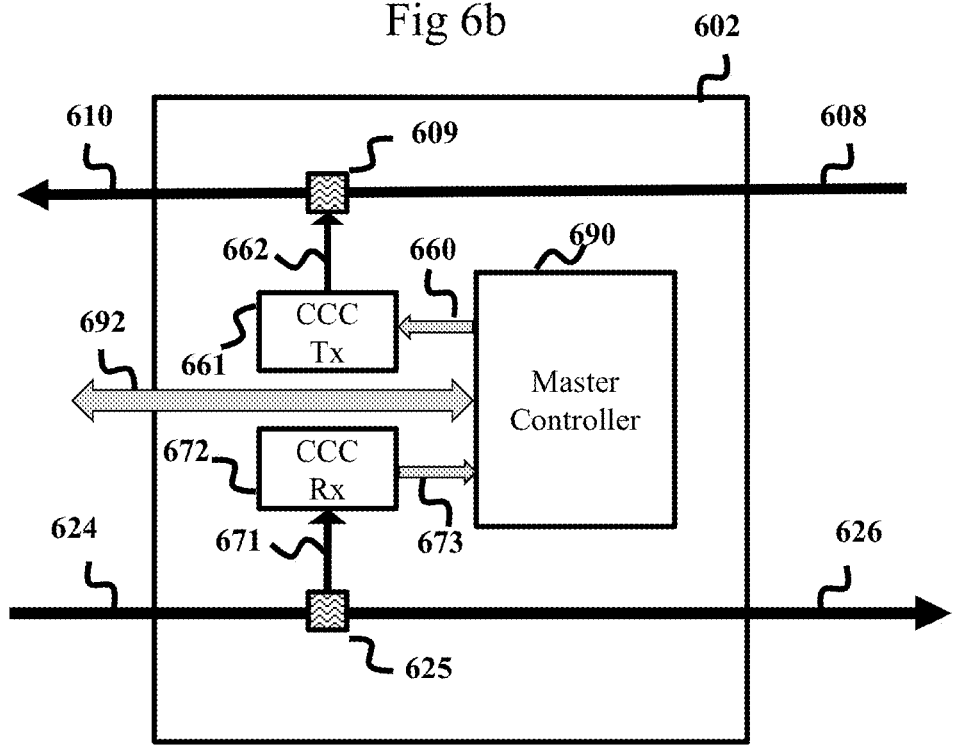
FIG. 6b shows a high level block diagram of an MSA compatible Master module, wherein the modules use a customer demarcation control channel (CCC) transported via an optical channel distinct from any associated optical data plane signal.

FIG. 6b depicts a block diagram of a minimally configured Master suitable for use with the Slave module shown in FIG. 6a. Both the Slave and the Master are managed and controlled as elements within a single domain FIG. 6a shows a preferred embodiment of a Slave module 601 that uses a CCC running over a dedicated optical channel between the Slave module and a Master. The Slave module 601 connects to incoming optical fiber 610 and outgoing optical fiber 624 for optically coupling the Slave module to a Master (such as the one shown in FIG. 6b). Slave module 601 also connects to optical output fiber 612 and incoming fiber 621 for optically coupling the Slave module to the WDM interface. The Slave module also connects to optional electrical interface 654 which allows storing and retrieving of optical signal parameters between the WDM Interface and memory 653 connected via the memory bus 652 to Slave controller 650. Slave controller 650 may, as in this example, use internal or external memory for storing optical signal parameters. In this embodiment, some of the information stored in external memory may be provided by the domain of the WDM interface, such as when the CPE node controller configures the WDM interface optics; some of this information may be provided when the status of the WDM interface changes; or some of this information may be provided when the WDM interface is configured to send performance data.

Incoming fiber 610 and outgoing fiber 624 carry aggregate optical signals on each fiber. The aggregate signals are composed of one or more optical data plane signals of the WDM interface and a CCC optical signal. The optical data plane signal(s) entering the Slave via fiber 610 originate at a peer WDM interface while the CCC optical signal originates at the Master of the near end SP's edge node. Filter 611, optically coupled to incoming fiber 610 separates the incoming CCC optical signal from the optical data plane signal(s). A first output of filter 611 forwards the optical data plane signal(s) to the WDM interface along optical path 612. A second output of filter 611 forwards the CCC optical signal to CCC Receiver 632 using the CCC optical control path 631. Filter 611 is, in this embodiment, a spectral filter separating the wavelength used by the CCC from that of the optical data plane signal(s), but in other embodiments may be one or more devices suitable for separating the CCC from the optical data plane signal(s), such as a polarization rotator and polarization splitter if the CCC is orthogonally polarized with respect to the optical data plane signal(s). CCC Receiver 632 is electrically connected to Slave controller 650 via path 633. CCC Receiver 632 recovers incoming CCC messages sent by said Master and passes them to Slave controller 650 for processing.

Incoming fiber 621 carries one or more optical data plane signal(s) from a WDM interface in the direction of output fiber 624. An optional VOA or switch 622, under the direct control of the Slave controller 650 via control path 651, receives the optical data plane signal(s) from fiber 621 and either blocks, attenuates or passes said signal(s) along to a first input of filter/coupler 623. In this embodiment, Slave controller 650 affects control of the access of the WDM interface optical data plane signal(s) into the SP's network through the control of VOA or switch 622. For example, Slave controller 650 will allow or block the WDM interface optical data plane signal(s) through VOA or switch 622 in accordance with the results of a comparison of allowance criteria received from a Master versus the optical signal parameter values known to Slave Controller 650.

Slave controller 650 is electrically connected to CCC Transmitter 642 via path 641. CCC Transmitter 642 uses the electrical signal from path 641 from Slave controller 650 and modulates the associated information onto the CCC optical carrier. The output of CCC Transmitter 642 is optically coupled to a second input of filter/coupler 623 via optical path 643. Filter/coupler 623 combines the optical signals arriving at both of its inputs to generate an aggregate optical signal composed of the optical data plane signal(s) and the CCC optical signal optically coupled to output fiber 624.

Slave controller 650 is here also coupled electrically to an optional external memory 653 using electrical path 652. External memory 653 is electrically coupled to the WDM interface equipment (not shown) using electrical path 654. When the Slave module conforms to an industry standard Multi-Source Agreement specification, such as that for XFP devices, the preferred embodiment of path 654 is a standard $I^2C$ interface. External memory 653 may be used to store one or more optical signal parameters, some of which may be provided by the WDM interface equipment, for use by Slave controller 650. Slave controller 650 is able to retrieve this information from memory and optionally send it to the Master using the CCC.

The optical data plane signal(s) received and transmitted by Slave module 601 in this embodiment are composed of a single modulated WDM optical signal. In other embodiments, the signal may, for example, involve a multi-frequency modulated signal such as an OFDM optical signal or a multi-lambda WDM optical signal. Further, it should be recognized that an associated receiver for the optical data plane signal(s)

may employ any relevant technique, such as either direct detection or coherent detection, all of which are consistent with the invention.

FIG. 6b depicts an embodiment of a corresponding Master 602 that uses a CCC running over a dedicated optical channel between Master and Slave. Master 602 connects to incoming fiber 608 and outgoing fiber 626 on the side opposite that connecting to a Slave. Master 602 also connects to output fiber 610 and incoming fiber 624 facing a Slave. Fibers 610 and 624 of a Slave such as that described in FIG. 6a would be connected to the fibers with the corresponding numbers in FIG. 6b. Master 602 also connects to an optional external interface 692 for communications between Master controller 690 and other elements within the SP's domain.

Incoming fiber 608 and outgoing fiber 626 each carry one or more optical data plane signal(s). Optical data plane signals received on fiber 608 are coupled to a first input of filter/coupler 609. A second input of filter/coupler 609 receives the optical signal carrying CCC messages that originate from Master controller 690. Master controller 690 sends CCC messages to the CCC Transmitter 661 along electrical path 660. CCC Transmitter 661 receives the signals on path 660 and uses them to modulate the CCC optical carrier. The optical output of CCC Transmitter 661 is optically coupled to said second input of filter/coupler 609 along path 662. Filter/coupler 609 combines the optical data plane signal(s) with the CCC optical signal at its single output which is in turn optically coupled to output fiber 610.

Outgoing fiber 610 and incoming fiber 624 each carry an aggregate optical signal between the Master and a Slave. The aggregate optical signal is composed of one or more optical data plane signal(s) and the CCC optical signal. Filter 625 receives the aggregate signal from incoming fiber 624 and separates the optical data plane signal(s) from the CCC optical signal. A first output of the filter passes the CCC optical signal on optical path 671. A second output of the filter passes the optical data plane signal(s) towards output fiber 626.

Path 671 connects filter 625 to CCC Receiver 672. Electrical path 673 connects CCC Receiver 672 to Master controller 690. CCC Receiver 672 recovers incoming CCC messages that were sent from the corresponding Slave (such as the one shown in FIG. 6a) and passes them to Master Controller 690 via path 673 for processing. External interface 692 connects Master controller 690 with, for example, the NE Controller of the SP edge node. The Master controller communicates with the NE controller to determine if the one or more optical signal parameter values it received from the Slave module meet the SP's acceptance criteria, or to obtain the one or more optical signal parameters and their acceptance criteria which govern allowance of the optical data plane signal(s) into the SP's network. As noted earlier, the Master controller may be a function of the NE controller or a separate processor which is optionally capable of interfacing with the NE controller and/or other control elements within the SP's domain, such as, without limitation, one or more EMSs and/or NMSs.

The Slave depicted in FIG. 6a is suitable for situations in which the optical signal parameter values obtained through interface 654 may be trusted as accurate by the comparison process used to determine whether to enable or disable access of the optical data plane signals from the WDM interface into the SP's domain. Situations such as this may, for example, exist when two different service providers are connecting to each other, and the business agreement and/or other factors provide a reasonable assurance of accuracy for such data. In other situations, however, the SP may not wish to trust such data, or the customer may deny access to such data. In such cases, an alternate embodiment such as the one depicted in FIG. 6c may be desirable.

Figure 6C:
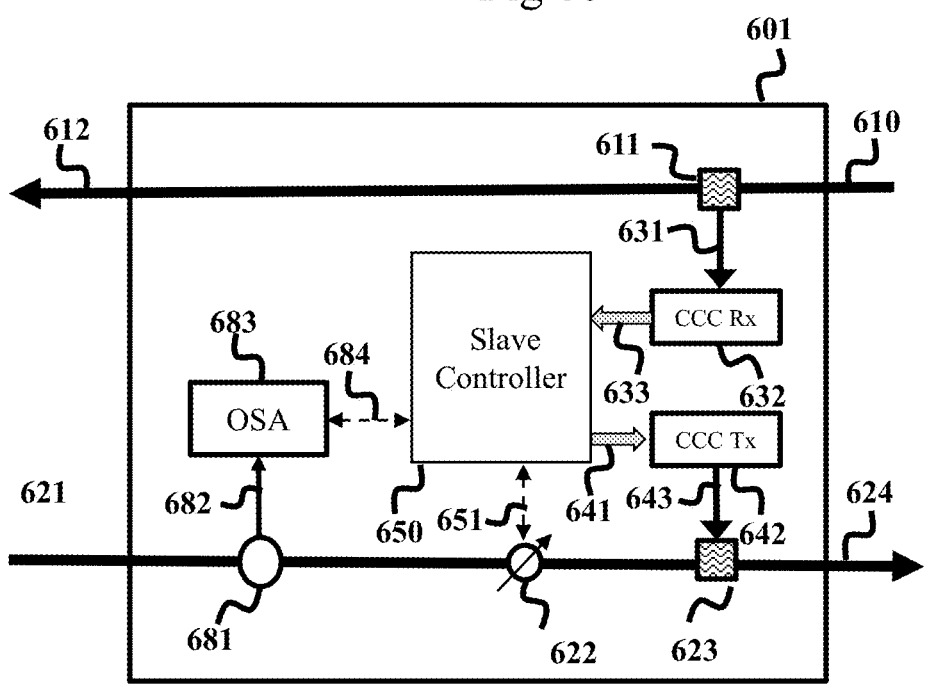

FIG. 6c depicts a Slave module similar to that of FIG. 6a, wherein the interface allowing Slave controller 650 to obtain optical signal parameter values via interfaces 652 and 654, and memory 653, does not exist. Instead, optical tap 681 is added to tap off a portion of the optical data plane signal(s) passing through it and provide said tapped portion via optical path 682 to optical spectrum analyzer (OSA) 683. OSA 683 analyzes the tapped portion of the optical data plane signal(s) to determine the optical signal parameter values desired by Slave controller 650, conveyed there between via path 684, for use in the comparison which will determine whether the optical data plane signals are permitted access into the SP's network. OSA 683 and/or Slave controller 650 will account for the optical impairments caused by optical tap 681 when determining said optical signal parameter values, effectively determining the optical signal parameter values applicable to the optical data plane signals as they exit optical tap 681. All other aspects of the Slave are otherwise the same as in the description of FIG. 6a.

Further variations, including combining the elements added in FIG. 6c to those of FIG. 6a are possible and remain consistent with the invention. Further, those skilled in the art will recognize that the OSA 683 of FIG. 6c may be replaced by several alternative structures so long as they are suitable for obtaining the needed optical signal parameter values. By way of non-exhaustive example, OSA 683 could be replaced by a tunable optical filter with its input connected to optical path 682 and its output connected to a photo-detector with an associated amplifier circuit. That structure may then be controlled by Slave controller 650 to tune across the optical spectral range of optical signals arriving via fiber 621 in such a manner that characteristics of the optical signals such as center wavelength(s), signal width(s) and optical power level(s) may be determined, thereby allowing Slave controller 650 to determine the corresponding optical signal parameter values. Alternatively, if optical tap 681 included an optical filter which restricted the optical wavelength and optical signal width to those allowed by the SP, and if therefore the only optical signal parameter value required by Slave controller 650 was the optical power level of the optical data plane signals, optical path 682 may connect directly to a photo-detector circuit which would thereby allow determination of said optical power level.

Figure 7A:
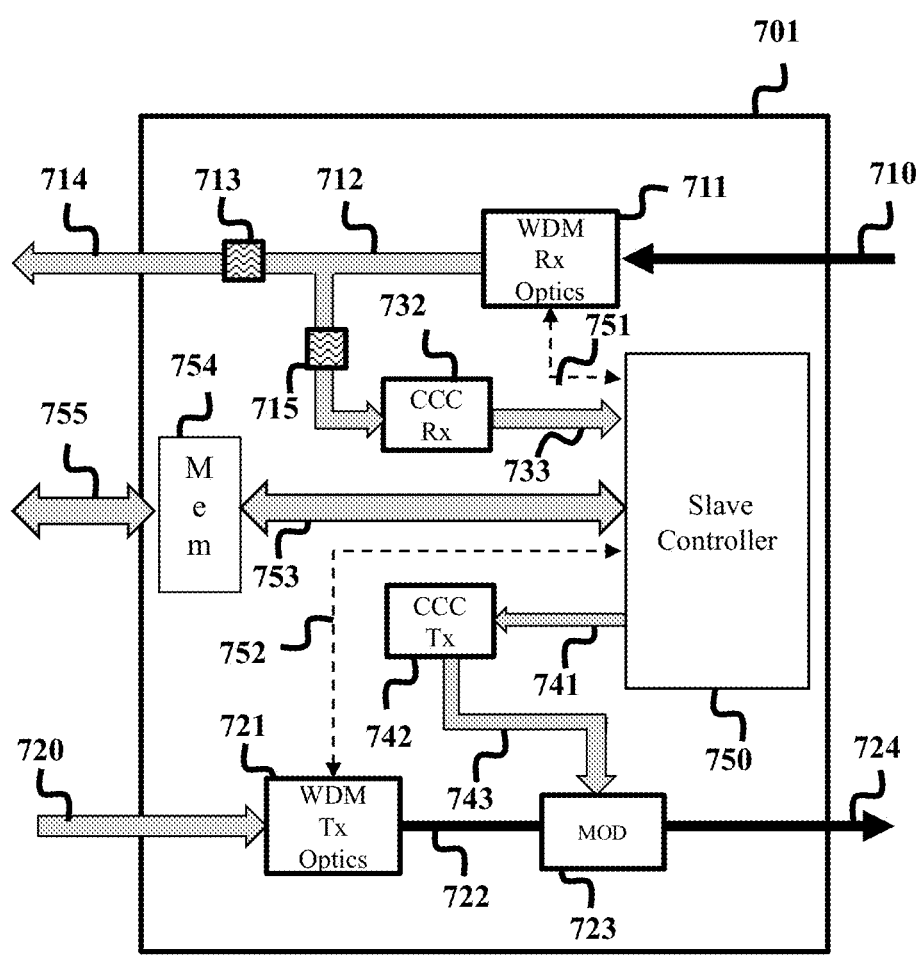
FIGS. 7a and 7b show the high level block diagrams of, respectively, an MSA compatible Slave module and an MSA compatible Master module using a customer demarcation control channel transported via a signal superimposed upon at least one of the optical data plane signals (also referenced herein as a pilot tone).

FIG. 7a shows a further embodiment of a Slave module which includes the WDM optics such that control of the optical data plane signal(s) and corresponding optical signal parameters is possible. In this particular embodiment the WDM optics are employed in such a manner that the CCC is transported via a pilot tone. A pilot tone uses one or more optical data plane signal(s), optionally carrying customer traffic, to transport an additional, lower relative symbol rate information stream, which is here the CCC. Use of a pilot tone as opposed to an independent optical signal for the CCC has the advantage that a Slave does not require a separate CCC optical source or detector. However, because the optical data plane signal(s) are used as the CCC carrier for conveying messages from the Slave to the Master, blocking the optical path between the WDM transmitter and the Master, as shown in FIG. 6a using switch/VOA 622 would prevent operation of the CCC channel. It should not be construed that the use of a pilot tone is required for Slave modules that contain WDM optics. An independent optical channel as described in 6a and 6b could also be used for the CCC without departing from the invention.

Slave module 701 physically resides within the CPE. The Slave module contains incoming optical fiber 710 and outgoing optical fiber 724 connecting the Slave module to a Master (such as the one shown in FIG. 7b). The Slave module also contains electrical input 720 and electrical output 714 connecting the Slave module to the customer domain equipment. The Slave module also contains optional external electrical interface 755 allowing the customer domain equipment to store optical signal parameter values into memory 754, which allows Slave controller 750 to retrieve said optical signal parameter values from memory 754 via memory bus 753. Slave controller 750 includes internal or external memory, shown here as external memory 754 for storing optical signal parameter values. Since in this embodiment the WDM optics reside within the Slave module, the Master may provide key optical signal parameter values as well as control the WDM optics by issuing requests to the Slave module. In this case, control over access of the optical data plane signal(s) into the SP's domain may be achieved by said control of the WDM optics.

Incoming fiber 710 and outgoing fiber 724 each carry aggregate optical signals. The aggregate signals are composed of one or more optical data plane signals and the CCC optical signal. The optical data plane signal(s) entering the Slave originate at a peer interface while the CCC optical signal originates at a Master. WDM Optical receiver 711 converts the aggregate optical signals into their constituent electrical frequency components for transmission along electrical path 712. High Pass Filter 713 passes the high frequency electrical components corresponding to customer data signals carried by the optical data plane signal(s) to output 714. These high frequency electrical component signals are then passed to the CPE. Low Pass Filter 715 passes the low frequency electrical components corresponding to the CCC information stream to CCC Receiver 732. CCC Receiver 732 recovers incoming CCC messages sent by a Master and passes them to Slave controller 750 via path 733. Slave controller 750 processes the messages.

Incoming electrical path 720 carries one or more customer data signals from the CPE in the direction of output fiber 724. A WDM optical transmitter 721, which may, for example, be composed of a WDM compatible laser, as an optical carrier source, and an integrated modulator, receives the customer data from incoming electrical path 720 and modulates the customer data information stream onto the optical carrier. CCC Modulator 723 receives on optical input path 722 the modulated optical data plane signal from WDM optical transmitter 721. Slave controller 750 generates CCC messages and sends them to CCC transmitter 742 along electrical path 741. CCC Transmitter 742 formats the messages for transmission along electrical path 743 to an electrical input of Modulator 723. Modulator 723 modulates the CCC messages onto the optical carrier as a pilot tone. The combined optical data plane signal with the CCC is then transmitted toward a Master on fiber 724. Slave Controller 750 will also obtain optical signal parameter data and/or exercise control through communication with the receiver 711 via path 751 and with transmitter 721 via path 752.

In this embodiment the Slave does not block the outgoing optical signal traversing optical fiber 724. This is because the CCC is transported by means of a pilot tone modulated on the optical data plane signal as its carrier. Therefore, blocking the access of the optical signal to the SP's network will be done by the Master at the SP edge node. This blocking forms at least a part of the control over the access of the optical data plane signal into the SP's domain, while control over one or more of the optical signal parameter values may also form at least a part of said access control. It should, therefore, be apparent that access control need not be achieved via a single means alone, or even at a single location or via a single device within the invention.

It should be noted that customer data is not required to be present at the input to the WDM transmitter for the pilot tone to function. It may, however, be preferable in this embodiment to generate an optical signal containing a known information stream, such as a pseudorandom number stream, instead of or as at least part of the customer signal, since this will allow communication and co-ordination at the customer information stream level.

The optical data plane signal received and transmitted by Slave module 701 may be composed of a single modulated optical carrier, or a multi-frequency modulated signal such as an OFDM optical signal. It should also be apparent that the use of techniques such as coherent detection is within the scope of the invention. For instance, a Slave module 701 might contain a homodyne or heterodyne optical receiver using a local optical reference and optical combiner to aid in the recovery of the baseband signal(s).

It should also be apparent to one skilled in the art that multi-lambda optical data plane signal(s) are within the scope of the invention. For example, the WDM optical receiver may include an optical de-multiplexer that separates the individual wavelengths for delivery to one or more optical receivers with corresponding electrical paths to the CPE. Consistent with the format chosen for the CCC, one or more CCC receivers may likewise be arranged along the one or more electrical signal paths from the optical receivers to recover one or more signal streams which may constitute interleaved portions or replicated copies of the CCC information stream. The CPE may also include one or more electrical paths to the Slave module wherein each electrical path is coupled to an optical transmitter, which may in turn be coupled to one or more CCC transmitter(s) and/or modulator(s), and wherein an optical multiplexer is used to combine the outputs for coupling to the output optical fiber. In such a multi-lambda case, the pilot tone transporting the CCC may be superimposed on one or more of the optical signals as carrier(s), with the CCC signal either interleaved or simultaneously replicated, depending upon the relationships of the CCC modulator(s) and the optical multiplexer.

Figure 7B:
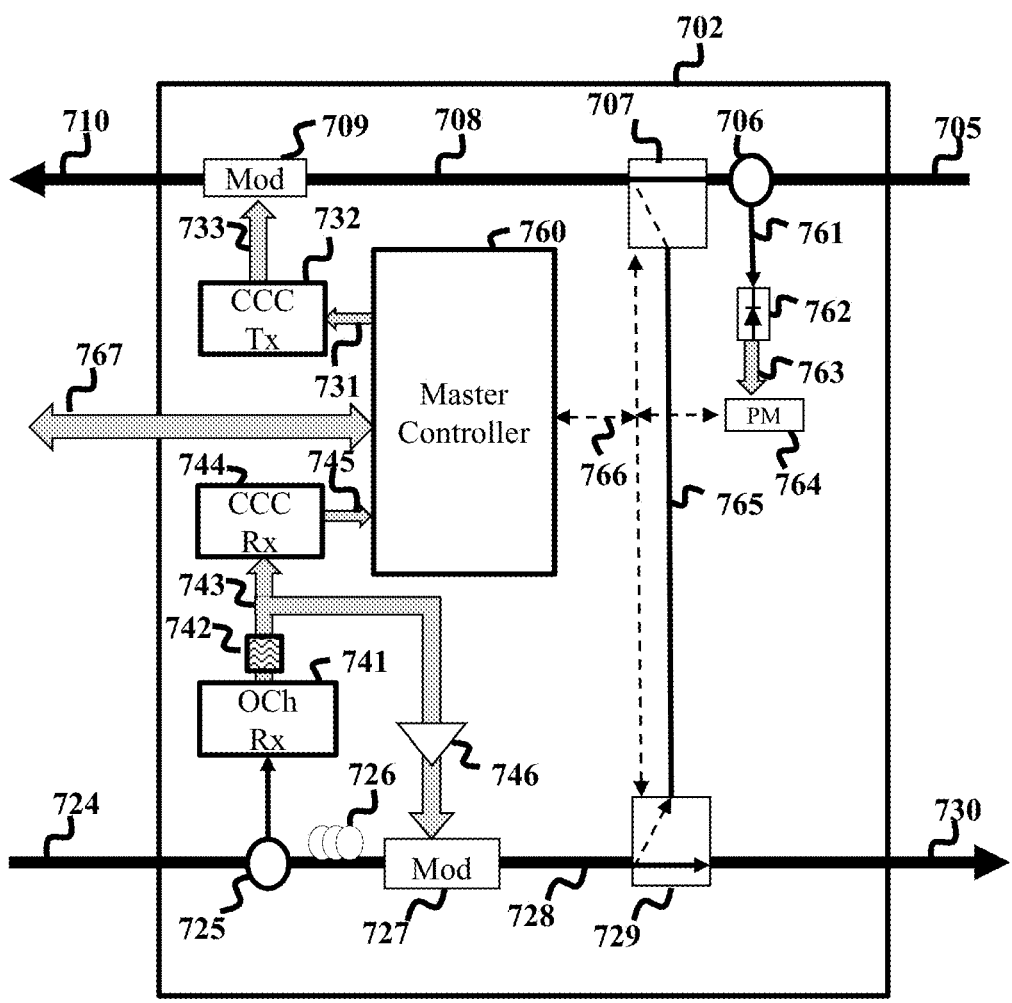

FIG. 7b shows an embodiment of a Master 702 that uses a pilot tone for the CCC, and which is suitable for use with Slave 701 of FIG. 7a. Master 702 contains input fiber 705 and output fiber 730 on the side opposite that connecting to a Slave. Master 702 also contains incoming optical fiber 724 and outgoing fiber 710 suitable for connection to the like numbered fibers of a Slave depicted in FIG. 7a. Master 702 here also contains an optional external interface 767 for communications with the NE controller of the SP edge node.

WDM optical signals from fiber 705 are received at the input of optical splitter 706. Optical splitter 706 is a 95/5 splitter passing 95% of the optical signal out its first output in the direction of optical switch 707. Switch 707 receives on its first input the optical signal from splitter 706. The output of switch 707 is connected via optical path 708 to the optical input of CCC Modulator 709. Master controller 760 directs CCC messages along path 731 to CCC transmitter 732. The output of CCC Transmitter 732 is conveyed along path 733 to modulator 709 which modulates the optical signal that was received in the first input of CCC Modulator 709 thereby sending CCC messages to the Slave module as a pilot tone of the optical data plane signal along fiber 710.

Incoming fiber 724 and outgoing fiber 710 carry aggregate optical signals on each fiber between the Master and a Slave.

Aggregate optical signals are composed of one or more optical data plane signals and the CCC optical signal. In this particular case the CCC optical signal is a pilot tone modulated on at least one optical data plane signal as a carrier. A 95/5 optical tap 725 receives and splits the power of the aggregate optical signal into two parts. A first part composed of 5% power of the incoming aggregate optical signal is transmitted to Receiver 741 and a second part composed of 95% power of the incoming aggregate optical signal is transmitted on a delayed optical path 726 toward a first input of CCC Inversing Modulator 727.

Receiver 741 converts the aggregate optical signal into its individual electrical frequency components and transmits them on electrical path 743. Low pass filter 742 passes through the low frequency electrical components corresponding to the information stream of the CCC. CCC Receiver 744 receives, recovers and filters the CCC messages for delivery to Master controller 760 via electrical path 745. Electrical path 743 also delivers a copy of the low frequency electrical components to an inverting amplifier 746. Amplifier 746 inverts the polarity of the low frequency electrical components and passes the resulting signal to the electrical input of CCC Inversing Modulator 727. The optical input to CCC Inversing Modulator 727 traverses delay path 726 that equals the delay of the path from optical tap 725 through receiver 741, low pass filter 742, along electrical path 743, through inverting amplifier 746, to the second input of CCC Inversing Modulator 727. Modulator 727 effectively removes the outgoing low frequency pilot tone modulation components, and hence the CCC, from the aggregate optical signal that was received from optical delay path 726. The optical data plane signal from the output of Modulator 727 follows optical path 728 to the input of optical switch 729. The optical data plane signal passes through the switch in the direction of optical output 730.

Since the normal operating mode of the CCC requires the optical data plane signal as a carrier, it is necessary for Master controller 760 to determine if the optical data plane signal arriving on fiber 705 is present. If it is, then Master controller 760 configures switch 707 in through mode thereby transmitting said received optical data plane signal in the direction of output 710. If said optical data plane signal is not present, Master controller 760 operates switches 707 and 729 so that the signal arriving at the input of 729 is switched to optical path 765 which is then switched to the output of switch 707 along optical path 708. This allows the optical data plane signal received by master 702 on input fiber 724 to be used as the optical carrier for the CCC signal transmitted to a Slave (not shown) connected to optical fiber 710. If and when the received optical data plane signal arriving on fiber 724 meets the acceptance criteria, and master controller 760 does not require the signal received from the slave to be looped back in order to provide the CCC optical carrier used for master to slave communication, Master controller 760 will operate optical switch 729 in through mode thereby transmitting the received optical data plane signal in the direction of output 730.

Master controller 760 uses the following mechanisms to determine if and when the switches need to be configured in through mode or loopback mode. A second output of optical splitter 706 splits 5% of the incoming optical data plane signal received from input fiber 705 along optical path 761. Photodetector 762 converts the signal received from path 761 to an electrical signal. The electrical signal is passed via electrical path 763 to a power monitor circuit 764 which measures the incoming intensity of the optical data plane signal. Master controller 760 is then able to read the output of power monitor 764 to determine if the optical data plane signal is present and whether it is strong enough to be used as a carrier for the pilot tone. If the incoming optical data plane signal can be used as the carrier of a pilot tone then Master controller 760 will enable switch 707 in through mode such that the optical data plane signal received from incoming fiber 705 is passed to CCC Modulator 709. If the incoming optical data plane signal from the far end is not present, or too weak, then Master controller 760 will configure switches 707 and 729 in loopback mode such that the modified optical data plane signal initially received from input fiber 724 is looped back along path 765 to outgoing fiber 710. It is preferable that whenever such a signal loopback is occurring, that the Master inform the Slave so that the Slave may inform the customer equipment that the optical data plane signals are being looped back, and therefore do not contain data from a peer. For example, a Slave may provide an indication of the loopback condition to the customer equipment by not transmitting the data plane signal from the Slave to the customer equipment, or by providing an indication through an interface such as optional external electrical interface 755 of FIG. 7a.

An optional external interface 767 connects Master controller 760 with the NE Controller of the SP edge node.

One skilled in the art will recognize that the splitter ratio of 95/5 may be altered, based upon the optical span engineering characteristics of the master to slave link, without departing from the spirit of the invention. Similarly, in other embodiments, additional elements such as optical amplifiers may be added along one or more of the optical paths without departing from the spirit of the invention. As long as the power levels of the signals are capable of operating as described the ratios of each splitter are flexible.

In the embodiments of FIGS. 7a and 7b, access to the SP's network is controlled by and at least partially at Master 702. When Master controller 760 compares optical signal parameter values obtained from a Slave to the corresponding acceptance criteria to determine whether the optical data plane signals may be allowed entry to the SP's network, Master controller 760 may allow the signals to enter the SP's network by controlling switch 729 via control path 766 so that the signals pass from optical path 728 to optical output path 730. When Master controller 760 determines that the signals should not be allowed entry to the SP's network, or when the signals must be looped back to enable CCC communication with a Slave, Master controller 760 controls switch 729 so that the signals pass from optical path 728 to optical path 765. Note that, as mentioned earlier, access control may here also involve control of one or more of the optical signal parameter values, such as the choice of wavelength produced by the optical source within the Slave.

Further variations are also possible within the scope of the invention. For example, switch 729 may be replaced by an optical splitter followed by a device able to block optical signal transmission along output optical fiber 730, allowing the signal to be looped back along optical path 765 in order to provide a carrier for the CCC while still enabling control over whether or not the signal is allowed access to the SP's network via output fiber 730. Further, additional devices such as optical amplifiers may be employed along the optical paths at any point without departing from the spirit of the invention.

Channel turn up or channel recovery requires a Master and Slave to perform a startup procedure wherein once the optical signal parameter values have been verified as being acceptable, access of the optical data plane signal(s) to the SP's network is allowed. At a Master/Slave pair at the far end of the network, that Master will ensure that access by that incoming optical data plane signal to the network will be allowed only when it determines that said incoming optical data plane signal also meets its criteria for acceptance. This has the effect of enabling a bi-directional end-to-end link. For example, the Master ports on each end will allow the optical data plane signal(s) in a given direction to pass through the SP's network from end to end only when the corresponding acceptance criteria has been met. If only one end has been verified, then the optical data plane signal(s) originating at that end may pass from end to end while the optical data plane signal(s) originating from the other end may not.

Figure 8:
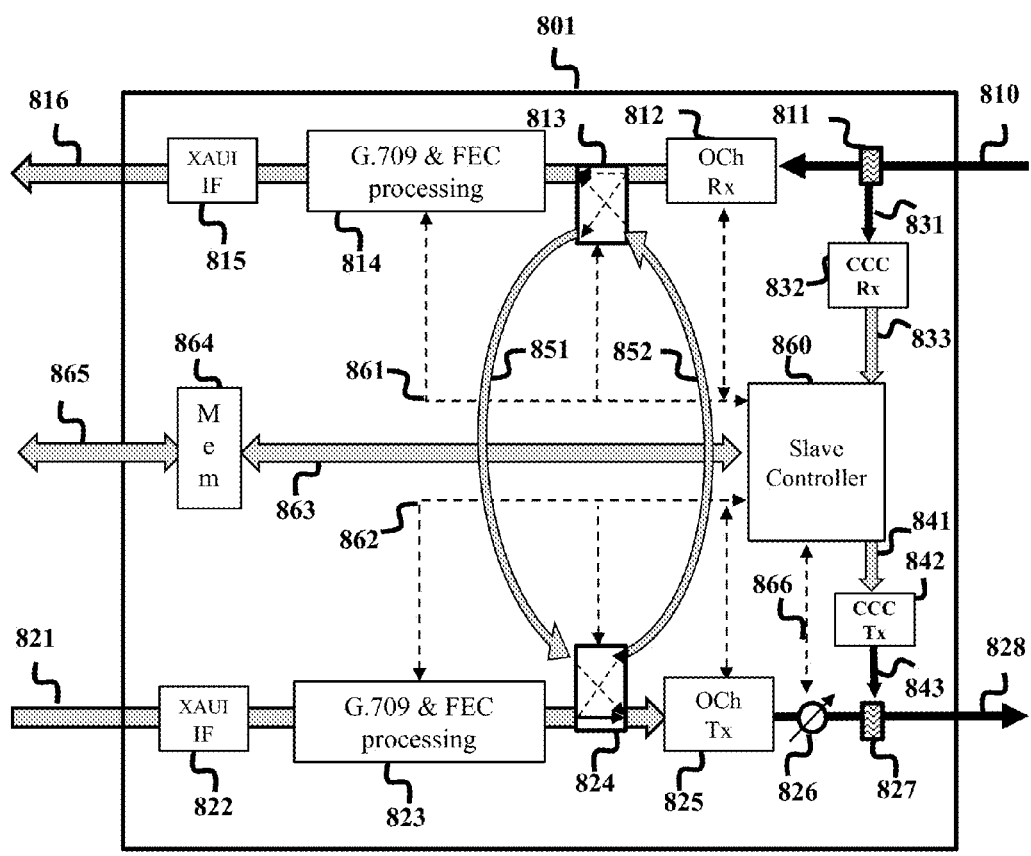
FIG. 8 shows an example of an MSA compatible Slave module offering access and/or control of both optical and electrical layer properties of the channel transported via one or more optical data plane signals by the service provider.

FIG. 8 shows a preferred embodiment of a Slave module 801 which includes WDM optics 812 and 825, the Optical Transport Network overhead processing blocks 814 and 823 and support for internal and external loopbacks 852 and 851 using switches 813 and 824. In this embodiment, the Slave module, under the control of a Master, enables the SP to manage and control aspects of the optical data plane signals, such as OTN layer overhead. The CCC is still transported in a manner independent of, and in addition to, any such overhead which constitutes a portion of the optical data plane signal(s) information stream(s). The CCC may, however, be utilized to access information related to such layers, such as fault indications or performance monitoring data, within the SP's domain.

Incoming fiber 810 and outgoing fiber 828 carry aggregate optical signals on each fiber. The aggregate optical signals are composed of one or more optical data plane signals and a CCC optical signal. The optical data plane signals entering the Slave may originate at a peer interface while the CCC optical signal originates at a Master. Filter 811 on incoming fiber 810 contains a single input to receive the incoming aggregate optical signal. The filter separates the incoming CCC wavelength from the optical data plane signal wavelength(s). A first output of the filter is directed to the optical input of receiver 812. The other output of filter 811 is directed to the optical input of CCC Receiver 832 using path 831. Path 833 connects the output of CCC Receiver 832 to Slave controller 860. CCC Receiver 832 recovers incoming CCC messages and passes them to Slave controller 860 for processing.

Receiver 812 receives the first output of filter 811 and converts incoming optical data plane signals to electrical signals. Electrical switch 813 has two inputs and two outputs. A first input receives the electrical signals from receiver 812. When loopbacks are disabled, the electrical signals pass through switch 813 in the direction of output path 816. G.709 and FEC processing block 814 receives these electrical signals from switch 813, processes the G.709 compliant OTN overhead and the FEC codes to correct detected errors. A XAUI interface 815 receives the signals from the output of G.709 and FEC processing block 814 and transfers the signals to the customer domain equipment via path 816. The XAUI interface in this embodiment is a PMD layered interface for 10G Ethernet optical modules and system backplanes. One skilled in the art will recognize that the modularity of the design allows for flexible replacement of PMD layered interfaces of which the XAUI interface is just one of many. These interface types typically include one or more serializer/deserializer (SERDES) in both transmit and receive directions for serializing and de-serializing the electrical signals of the customer's data stream to and from a Slave module.

Incoming electrical path 821 and outgoing electrical path 816 carry customer data to and from the Slave module 801, respectively. Customer electrical signals are received by the XAUI interface 822 from incoming path 821. G.709 and FEC overhead processing block 823 connected to the output of XAUI interface 822 adds transport network overhead information and forward error correction codes as part of creating a 'digitally wrapped' OTN compliant signal. The OTN layered signal is transmitted to switch 824. Switch 824 has two inputs and two outputs. Assuming loopback is disabled, the OTN layered signal is passed though switch 824 to transmitter 825. WDM optical transmitter 825 may, for example, contain a modulator and laser. Transmitter 825 modulates an optical carrier signal using the electrical signal received from the first output of switch 824. An optional VOA 826 receives the optical data plane signal from Transmitter 825. VOA 826 may be controlled by Slave controller 860 using control path 866. Slave controller 860 controls VOA 826 to pass through, attenuate or block its output as directed by a Master. Optical data plane signals that pass through VOA 826 are received by optical filter/coupler 827. A second input of coupler 827 is connected to the output of CCC transmitter 842 using optical path 843. Electrical path 841 connects the input of CCC transmitter 842 to Slave controller 860. Slave controller 860 transmits CCC messages to a Master controller (not shown) using CCC transmitter 842. Coupler 827 couples the CCC wavelength along with the optical data plane signals to output fiber 828.

An internal loopback uses loopback path 852 and switches 824 and 813 to loopback electrical signals received on incoming path 821 to outgoing path 816. OTN overhead is added at 823 to the customer data before electrical switch 824 and it is removed from the customer data at 814 after electrical switch 813. This loopback is under the control of Slave controller 860 and may be initiated by a Master controller during maintenance activities. A Master controller may initiate the activity using a CCC message to the Slave controller. Slave controller 860 uses internal paths 861 and 862 to configure optical switches 824 and 813. Access to OTN overhead may also be available to a Master controller using CCC messaging. This information can optionally also be made available via external interface path 865, memory 864 and path 863.

An external loopback uses these same optical switches to loopback the optical data plane signals from incoming path 810 to outgoing path 828. This loopback converts the optical data plane signals to electrical signals at receiver 812, then switches the electrical signals along path 851 to switch 824 and converts them back to optical data plane signals at transmitter 825. This enables the SP to verify the optical path and the optical transceiver functions between a Master and Slave.

The preferred embodiment of FIG. 8 enables complete control over the optical signal parameter values by a Master. For example, a Master can send a message to Slave 801 whereby the information in the message assigns properties such as a specified center wavelength and launching power for the optical data plane signal. Slave controller 860 processes the message and uses control path 862 to provision transmitter 825 as specified in the message. Slave controller 860 may also use control path 866 to attenuate the optical data plane signal to the specified launching power. This latter parameter may require periodic communication from a Master whereby said Master issues commands to increase or decrease the output of VOA 826 by some specified amount. Slave controller 860 also has direct access to the OTN overhead bytes using paths 861 and 862. It is also possible to configure memory 864 such that access to some of the SP's information is available to the customer domain via path 865.

It is also consistent with the invention to allow some of the optical signal parameter values to be controlled by the customer domain while others are controlled by the SP's domain. For example, in the embodiment of FIG. 8, the customer may control the modulation format while the SP controls characteristics of the optical data plane signals such as center frequency and optical launch power. The SP would, in this instance be able to query, but not control, the value of the properties controlled by the customer, while the customer may be allowed to query but not control those properties controlled by the SP. Provided the SP has the ability to control access to its optical network based upon its own determination of whether one or more optical signal parameter values meets its acceptance criteria, such partitioned control instances are consistent with the invention.

Figure 9:
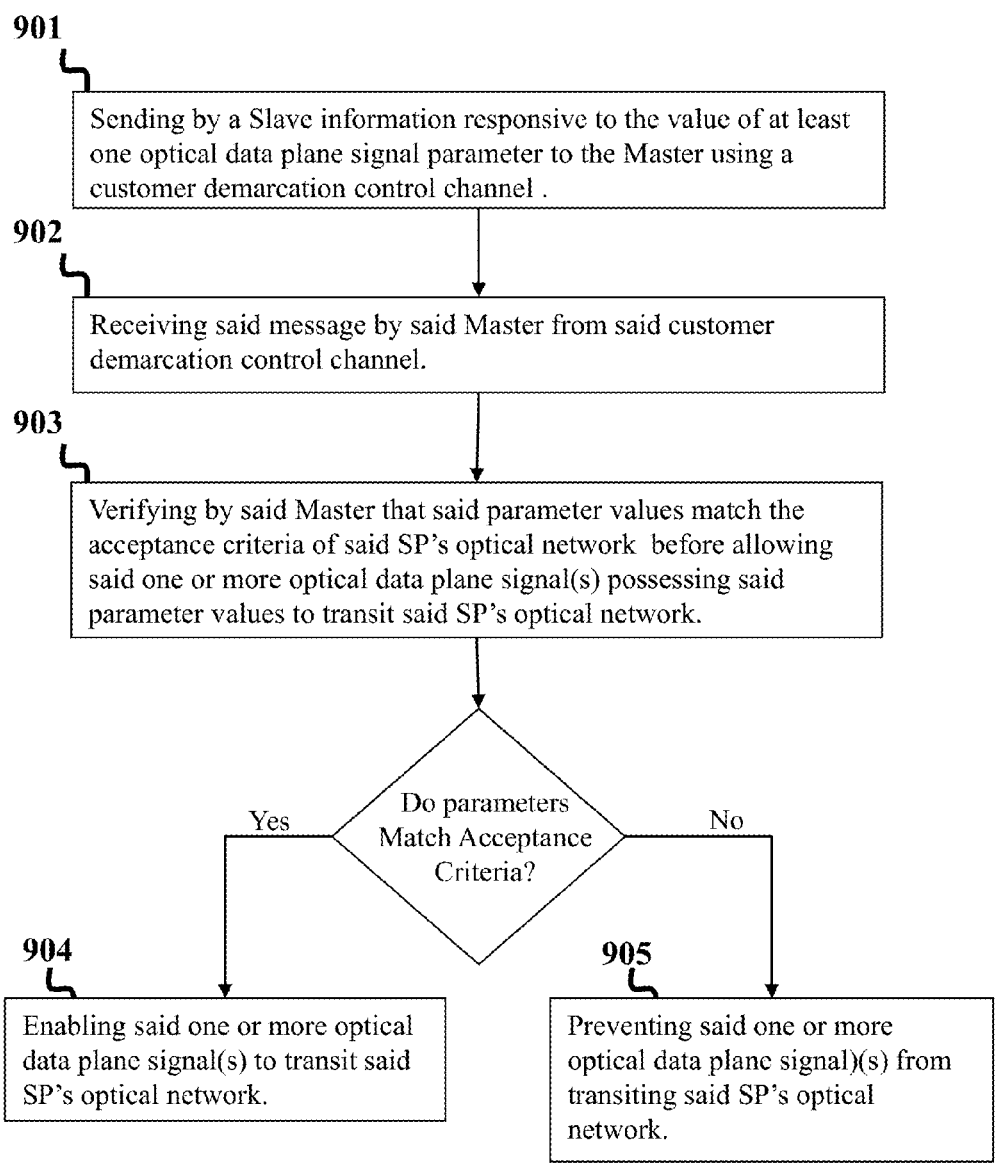
FIG. 9 shows an example method for verifying the optical parameters associated with at least one optical data plane signal originating at or within CPE equipment, wherein the inventive method determines whether or not the optical data plane signal meets the criteria of acceptance as defined by the service provider's network management system.

FIG. 9 depicts a flow chart describing a preferred method of verifying whether the optical signal parameter values of one or more optical data plane signals associated with a Slave meet the acceptance criteria defined by the SP when verification is performed by a Master.

Before access to at least a portion of the SP's network is granted, one or more optical data plane signals are blocked either at the Slave in the direction of the SP's network or by the Master in the direction away from the Slave. Only after the optical signal parameter values have been verified according to criteria defined by the SP will access be granted and the optical data plane signals are allowed to pass beyond the point at which the signals may be blocked.

In step 901 the Slave sends a message containing the optical signal parameter value(s) to the Master, which is received by said Master in step 902. The optical signal parameter values may already be known to the Slave, or it may, prior to sending them, retrieve them if necessary. In step 903 the Master controller verifies that the optical signal parameter values match the acceptance criteria defined by the SP. If the optical signal parameter values match the acceptance criteria defined by the SP, then at step 904 access is enabled and, optionally, a message conveying 'criteria met, access enabled' may be sent by the Master to the Slave. Enabling access to the network may be accomplished by controlling the output from the Slave once the acceptance message from the Master has been received, or by controlling the output of the Master in the direction away from the Slave, or by a combination thereof. If the optical signal parameter values do not match the acceptance criteria defined by the SP, then at step 905 the Master prevents access of the optical data plane signals into at least a portion of the SP's network and may, optionally, send a message to the Slave module conveying 'criteria not met, access denied'.

A variation of the method disclosed in FIG. 9 includes a modification of step 901 such that the Slave controller sends an unsolicited periodic message containing one or more optical signal parameter values via the CCC to the Master. Another variation includes sending the optical signal parameter values in response to a request from the Master.

An alternate preferred method of verifying whether the optical signal parameter values of the optical data plane signals associated with a Slave meet the acceptance criteria defined by the SP, wherein the verification is performed at the Slave, is depicted in FIG. 10. In this method, the Master sends the acceptance criteria for at least one optical signal parameter to the Slave via the CCC in Step 1001. In Step 1002, the Slave receives said acceptance criteria sent by the Master from the CCC. In Step 1003, the Slave verifies the corresponding optical signal parameter values against said acceptance criteria to determine whether or not said optical data plane signal(s) should be allowed access to at least a portion of the SP's network. The optical signal parameter values may already be known to the Slave, or it may first retrieve them if necessary. If the determination is that said access is allowed, Step 1004 enables such access, otherwise such access is prevented at Step 1005. The allowance or prevention of optical data plane signals transit of at least a portion of the SP's domain may be performed at the Slave, after which the Slave may inform the Master of the allowance or prevention, or the Slave may inform the Master of said determination and the Master may perform the allowance or prevention, or both the Master and the Slave may perform all or portions of the allowance or prevention.

Those skilled in the art will appreciate that various changes and modifications may be made to the embodiments without departing from the spirit or scope of the invention. It is intended that such changes and modifications be included within the scope of the invention. Further, it is intended that the invention not be limited to the embodiments described herein, nor to those changes and modifications apparent as of the filing date of this application. It is intended that the invention be limited in scope only by the appended claims.

We claim:

1. In an optical network connecting a customer's network element in a customer's network with a service provider's network element in a service provider's network, a customer optical interface apparatus comprising:
   a customer interface within said customer's network element for optically conveying one or more optical data plane signals to a provider interface within said service provider's network element,
   a customer controller within said customer's network element coupled to a provider controller within said service provider's network, wherein said customer controller and said provider controller are managed within said service provider's network, and wherein said customer's network element is managed at least in part, but not entirely, within said customer's network, and
   a customer demarcation control channel for conveying, between said customer controller and said provider controller, information of at least one optical signal parameter associated with said one or more optical data plane signals, and wherein said provider controller is configured to enable and to prohibit the transmission of said one or more optical data plane signals in accordance with said information, and wherein said control channel is not demodulated with said one or more optical data plane signals at said provider controller.

2. The apparatus of claim 1 further comprising:
   an optical frequency shifter wherein the output of said optical frequency shifter is optically coupled to said customer interface.

3. The apparatus of claim 1 further comprising:
   at least one optical transmitter, coupled to said customer controller, for optically transmitting signals conveying said customer demarcation control channel to said customer interface.

4. The apparatus of claim 1 wherein:
   said customer demarcation control channel is superimposed upon at least one of said one or more optical data plane signals.

5. The apparatus of claim 1 further comprising:
   an optical power attenuator optically coupled to said customer interface for attenuating the optical power level of said one or more optical data plane signals, wherein said optical power attenuator is coupled to said customer controller, and wherein said customer controller and said provider controller co-operate to control said optical power attenuator in accordance with said information.

6. The apparatus of claim 1 further comprising:
   an optical data plane signal transmitter optically coupled to said customer interface.

7. The apparatus of claim 6 wherein:
said optical data plane signal transmitter creates said one or more optical data plane signals by adding forward error correction and optical transport network overhead information to an information stream and conveys said one or more optical data plane signals to said customer interface.

8. In an optical network connecting a customer's network element in a customer's network with a service provider's network element in a service provider's network, a provider optical interface apparatus comprising:
a provider interface within said service provider's network element coupled to a customer interface within said customer's network element, said customer interface for optically conveying one or more optical data plane signals to said provider interface,
a provider controller within said service provider's network coupled to a customer controller within said customer's network element, wherein said customer controller and said provider controller are managed within said service provider's network, and wherein said customer's network element is managed at least in part, but not entirely, within said customer's network, and
a customer demarcation control channel for conveying, between said customer controller and said provider controller, information of at least one optical signal parameter associated with said one or more optical data plane signals, and wherein said provider controller is configured to enable and to prohibit the transmission of said one or more optical data plane signals in accordance with said information, and wherein said customer demarcation control channel is not demodulated with said one or more optical data plane signals at said provider controller.

9. The apparatus of claim 8 further comprising:
an optical receiver coupled to said provider controller for receiving said customer demarcation control channel, wherein said customer demarcation control channel was superimposed upon at least one of said one or more optical data plane signals.

10. The apparatus of claim 8 further comprising:
an optical receiver coupled to said provider controller for receiving optical control channel signals conveying said customer demarcation control channel, wherein said optical control channel signals differ from said one or more optical data plane signals based upon at least one of optical signal spectral range or state of polarization.

11. In an optical network connecting a customer's network element within a customer's network with a service provider's network element in a service provider's network, a system for providing optical demarcation, comprising:
a customer interface within said customer's network element,
a provider interface within said service provider's network element optically coupled to said customer interface, said customer interface for optically conveying one or more optical data plane signals to said provider interface,
a provider controller within said service provider's network,
a customer controller within said customer's network element coupled to said provider controller, wherein said customer controller and said provider controller are managed within said service provider's network, and wherein said customer's network element is managed at least in part, but not entirely, within said customer's network, and
a customer demarcation control channel for conveying, between said customer controller and said provider controller, information of at least one optical signal parameter associated with said one or more optical data plane signals, and wherein said provider controller is configured to enable and to prohibit the transmission of said one or more optical data plane signals in accordance with said information, and wherein said customer demarcation control channel is not demodulated with said one or more optical data plane signals at said provider controller.

12. The system of claim 11 further comprising:
at least one optical frequency shifter wherein the output of said at least one optical frequency shifter is optically coupled to said customer interface.

13. The system of claim 11 further comprising:
at least one optical receiver coupled to said provider controller for receiving optical signals conveying said customer demarcation control channel,
wherein said customer demarcation control channel is superimposed upon at least one of said one or more optical data plane signals.

14. The system of claim 11 further comprising:
at least one optical transmitter coupled to said customer controller for transmitting optical signals conveying said customer demarcation control channel, and
at least one optical receiver coupled to said provider controller for receiving said optical signals conveying said customer demarcation control channel.

15. The system of claim 11 further comprising:
at least one optical transmitter, coupled to said provider controller for transmitting optical signals conveying said customer demarcation control channel, and
at least one optical receiver coupled to said customer controller for receiving said optical signals conveying said customer demarcation control channel.

16. The system of claim 11 further comprising:
an optical power attenuator coupled to said provider controller.

17. The system of claim 11 further comprising:
an optical data plane signal transmitter optically coupled to said customer interface.

18. A method for controlling transmission of at least one optical data plane signal sent from a customer optical interface within a customer's network element in a customer's network towards a provider optical interface within a service provider's network element in a service provider's network, the method comprising:
conveying information representing a value of at least one optical signal parameter associated with said at least one optical data plane signal, by,
sending said information from a customer controller at said customer's network element to a provider controller within said service provider's network via a customer demarcation control channel conveyed there between, wherein said customer's network element is at least partially, but not entirely, managed within said customer's network, and wherein said customer controller and said provider controller are both managed within said service provider's network, and receiving said information at said provider controller, and
enabling or prohibiting the transmission of said one or more optical data plane signals in accordance with said information, by,
verifying at said provider controller that said information indicates that the value of said at least one optical signal parameter is an acceptable value, and
enabling said at least one optical data plane signal to transit at least a portion of said service provider's network if said value of said at least one optical signal parameter is an acceptable value, or prohibiting said at least one optical data plane signal from transiting at least a portion of said service provider's network if said value of said at least one optical signal parameter is not an acceptable value; and wherein said control channel is not demodulated with said one or more optical data plane signals at said provider controller.

19. The method of claim 18 wherein:

said sending information is performed in response to a request sent via said customer demarcation control channel from said provider controller to said customer controller.

20. The method of claim 18 wherein:

said enabling or said prohibiting is performed in response to information sent via said customer demarcation control channel from said provider controller to said customer controller.

21. The method of claim 18 wherein:

said sending information is performed at least each time said value of said at least one optical signal parameter changes.

22. A method for controlling transmission of at least one optical data plane signal sent from a customer optical interface within a customer's network element of a customer's network towards a provider optical interface within a service provider's network element in a service provider's network, the method comprising:

conveying information representing acceptance criteria for at least one optical signal parameter associated with said at least one optical data plane signal, by, sending said information from a provider controller within said service provider's network to a customer controller at said customer's network element via a customer demarcation control channel conveyed there between, wherein said customer's network element is at least partially, but not entirely, managed within said customer's network, and wherein said customer controller and said provider controller are both managed within said service provider's network, and receiving at said customer controller said information, and enabling or prohibiting the transmission of said one or more optical data plane signals in accordance with said information, by, verifying at said customer controller whether a value of said at least one optical signal parameter conforms to corresponding said information and, enabling said at least one optical data plane signal to transit at least a portion of said service provider's network if said value of said at least one optical signal parameter is verified as conforming to said information or prohibiting said at least one optical data plane signal from transiting at least a portion of said service provider's network if said value of said at least one optical signal parameter is not verified as conforming to said information; and wherein said control channel is not demodulated with said one or more optical data plane signals at said provider controller.

23. The method of claim 22 wherein:

said sending information is performed in response to a request sent via said customer demarcation control channel from said customer controller to said provider controller.

24. The method of claim 22 wherein:

said verifying and said enabling or said prohibiting are performed at least each time said value of said at least one optical signal parameter changes.

25. The apparatus of claim 1 wherein:

said customer optical interface apparatus constitutes at least a portion of a pluggable module.

26. The apparatus of claim 1 further comprising:

an optical receiver coupled to said provider controller for receiving said customer demarcation control channel.

27. The apparatus of claim 8 further comprising:

an optical transmitter coupled to said provider controller for transmitting said customer demarcation control channel.

28. The apparatus of claim 8 further comprising:

an optical power attenuator coupled to said customer controller, and optically coupled to said customer interface.

29. The system of claim 12 wherein:

said at least one optical frequency shifter is coupled to said customer controller and is managed within said service provider's network.

30. The apparatus of claim 1 wherein:

said customer controller is configured to control a value of at least one optical signal parameter associated with said one or more optical data plane signals.

31. The apparatus of claim 8 wherein:

said provider controller is configured to convey a value of at least one optical signal parameter associated with said one or more optical data plane signals to said customer controller.

32. The system of claim 11 wherein:

said provider controller is configured to convey a value of at least one optical signal parameter associated with said one or more optical data plane signals to said customer controller, and said customer controller is configured to control said value of at least one optical signal parameter associated with said one or more optical data plane signals.

33. The method of claim 18 further comprising:

conveying, by said provider controller, a value of at least one optical signal parameter associated with said one or more optical data plane signals to said customer controller, and controlling, by said customer controller, said value of at least one optical signal parameter associated with said one or more optical data plane signals.

\* \* \* \* \*